(12) United States Patent
Shimizu et al.

(10) Patent No.: US 12,288,305 B2
(45) Date of Patent: Apr. 29, 2025

(54) WEARABLE TERMINAL APPARATUS TO CHANGE DISPLAY POSITION OF PARTIAL IMAGE

(71) Applicant: KYOCERA Corporation, Kyoto (JP)

(72) Inventors: Kai Shimizu, Yokohama (JP);
Tomokazu Adachi, Yokohama (JP);
Shingo Ito, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/574,672

(22) PCT Filed: Jun. 30, 2021

(86) PCT No.: PCT/JP2021/024806
§ 371 (c)(1),
(2) Date: Dec. 27, 2023

(87) PCT Pub. No.: WO2023/276058
PCT Pub. Date: Jan. 5, 2023

(65) Prior Publication Data
US 2024/0303948 A1    Sep. 12, 2024

(51) Int. Cl.
*G06F 3/01*      (2006.01)
*G06F 3/04815*   (2022.01)
*G06T 19/00*     (2011.01)
*G06T 19/20*     (2011.01)

(52) U.S. Cl.
CPC ............... *G06T 19/20* (2013.01); *G06F 3/012* (2013.01); *G06F 3/04815* (2013.01); *G06T 19/006* (2013.01); *G06T 2200/24* (2013.01); *G06T 2219/2004* (2013.01); *G06T 2219/2024* (2013.01)

(58) Field of Classification Search
None
See application file for complete search history.

(56) References Cited

U.S. PATENT DOCUMENTS

| | | | |
|---|---|---|---|
| 2018/0253149 A1 | 9/2018 | Norieda et al. | |
| 2018/0359462 A1 | 12/2018 | Shinohara | |
| 2019/0087021 A1 | 3/2019 | Balan et al. | |
| 2019/0286252 A1* | 9/2019 | Beach | G06F 3/04815 |
| 2019/0340822 A1 | 11/2019 | Ernst et al. | |
| 2023/0214017 A1* | 7/2023 | Byerley | G09G 5/006 |
| | | | 345/156 |

FOREIGN PATENT DOCUMENTS

| | | | | |
|---|---|---|---|---|
| CN | 108932056 B | * | 4/2021 | ............... G06F 3/011 |
| WO | 2017/022291 A1 | | 2/2017 | |
| WO | 2017/145423 A1 | | 8/2017 | |

* cited by examiner

*Primary Examiner* — Duane N Taylor, Jr.
(74) *Attorney, Agent, or Firm* — Studebaker Brackett PLLC

(57) ABSTRACT

A wearable terminal apparatus to be worn by a user for use includes a display unit and at least one processor. The at least one processor causes the display unit to display a virtual image located in a space. The at least one processor changes a display position of a partial image when a predetermined condition is satisfied, the partial image being an image of a partial region included in the virtual image.

24 Claims, 18 Drawing Sheets

WEARABLE TERMINAL APPARATUS TO CHANGE DISPLAY POSITION OF PARTIAL IMAGE

TECHNICAL FIELD

The present disclosure relates to a wearable terminal apparatus, a program, and a display method.

BACKGROUND OF INVENTION

In the related art, virtual reality (VR), mixed reality (MR), and augmented reality (AR) are known technologies that allow a user to experience a virtual image and/or a virtual space using a wearable terminal apparatus worn by the user on the head. The wearable terminal apparatus includes a display unit that covers the field of vision of the user when worn by the user. A virtual image and/or a virtual space are/is displayed on this display unit in accordance with a position and an orientation of the user. In this manner, a visual effect as if the virtual image and/or the virtual space were present is implemented (for example, U.S. Patent Application Publication No. 2019/0087021 and U.S. Patent Application Publication No. 2019/0340822).

MR is a technology that displays a virtual image as if the virtual image were present at a predetermined position in a real space while allowing a user to visually recognize the real space, to allow the user to experience mixed reality in which the real space and the virtual image are merged. VR is a technology that allows a user to visually recognize a virtual space instead of the real space in MR, to allow the user to experience as if the user were in the virtual space.

A display position of the virtual image displayed in VR and MR is determined in a space in which the user is located. When the display position is inside the visible region of the user, the virtual image is displayed on the display unit and is visually recognized by the user.

SUMMARY

In the present disclosure, a wearable terminal apparatus to be worn by a user for use includes a display unit and at least one processor. The at least one processor causes the display unit to display a virtual image located in a space. The at least one processor changes a display position of a partial image when a predetermined condition is satisfied, the partial image being an image of a partial region included in the virtual image.

In the present disclosure, a program causes a computer provided in a wearable terminal apparatus to be worn by a user for use to perform a process. The process includes causing a display unit to display a virtual image located in a space. The process also includes changing a display position of a partial image when a predetermined condition is satisfied, the partial image being an image of a partial region included in the virtual image.

In the present disclosure, a display method is for a wearable terminal apparatus to be worn by the user for use. The display method includes causing a display unit to display a virtual image located in a space. The display method also includes changing a display position of a partial image when a predetermined condition is satisfied, the partial image being an image of a partial region included in the virtual image.

DESCRIPTION OF EMBODIMENTS

Embodiments are described below with reference to the drawings. Note that each drawing to be referred to below illustrates in a simplified manner merely major members necessary for describing the embodiments for convenience of explanation. Therefore, a wearable terminal apparatus 10 and an information processing apparatus 20 according to the present disclosure may include any constituent member that is not illustrated in drawings to be referred to.

First Embodiment

Figure 1:
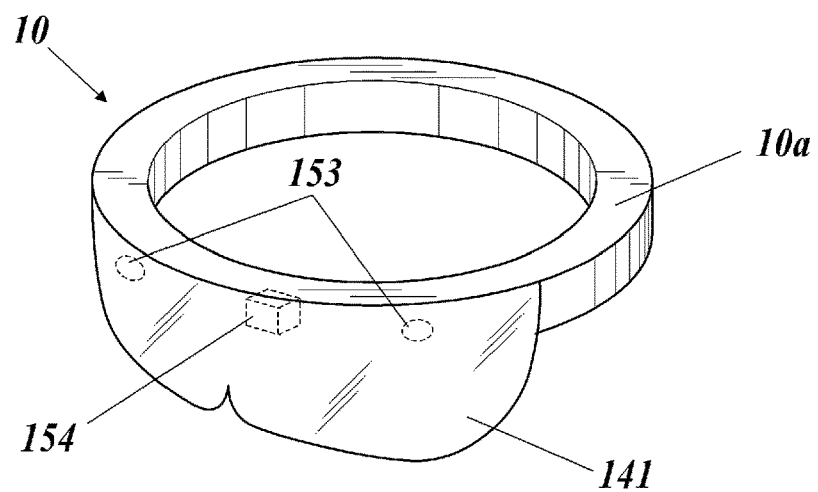
FIG. 1 is a schematic perspective view of a configuration of a wearable terminal apparatus according to a first embodiment.

As illustrated in FIG. 1, the wearable terminal apparatus 10 includes a body 10a and a visor 141 (display member) attached to the body 10a.

The body 10a is an annular member having an adjustable circumferential length. The body 10a includes various devices such as a depth sensor 153 and a camera 154 built therein. When a user wears the body 10a on the head, the visor 141 covers the field of vision of the user.

The visor 141 has a light-transmitting property. The user can visually recognize a real space through the visor 141. The body 10a includes a laser scanner 142 (see FIG. 5) therein. The laser scanner 142 projects and displays an image such as a virtual image onto a display surface of the visor 141 facing the eyes of the user. The user visually recognizes the virtual image by reflected light from the display surface. At this time, the user also visually recognizes the real space through the visor 141. Thus, a visual effect as if the virtual image were present in the real space is obtained.

Figure 2:
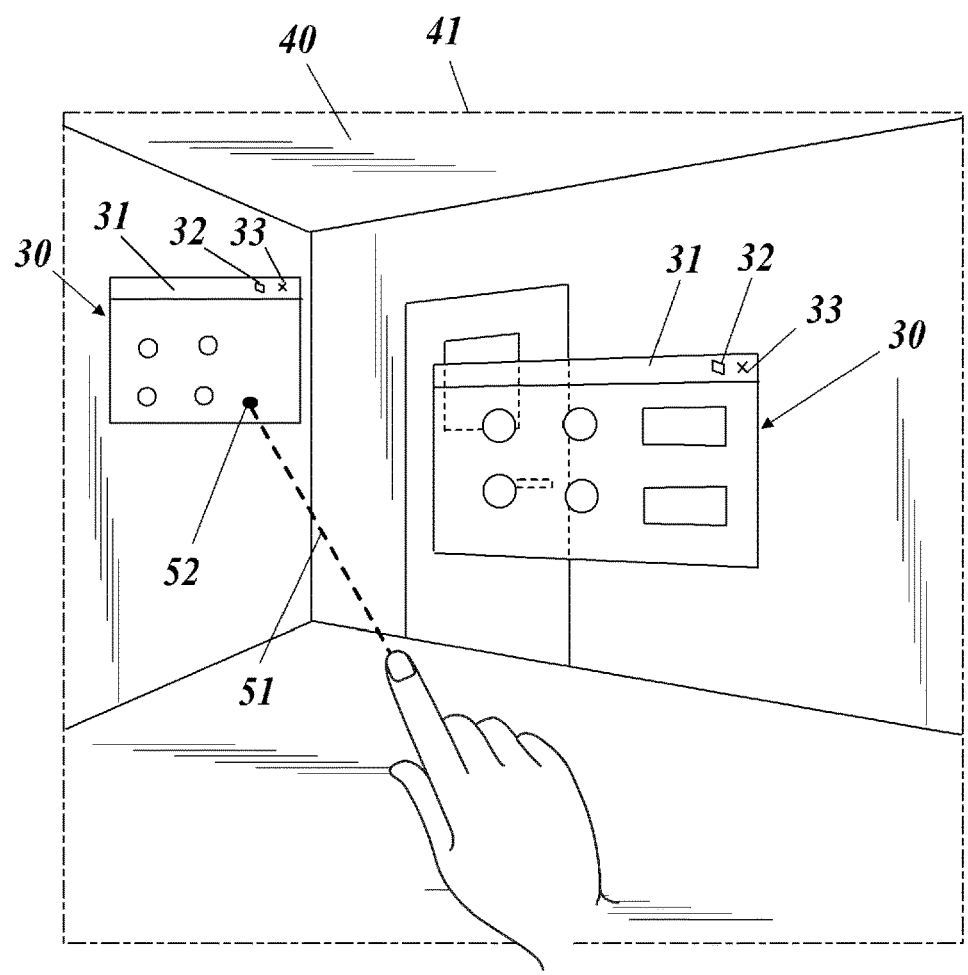
FIG. 2 is a diagram illustrating an example of a visible region and a virtual image visually recognized by a user wearing the wearable terminal apparatus.
Figure 3:
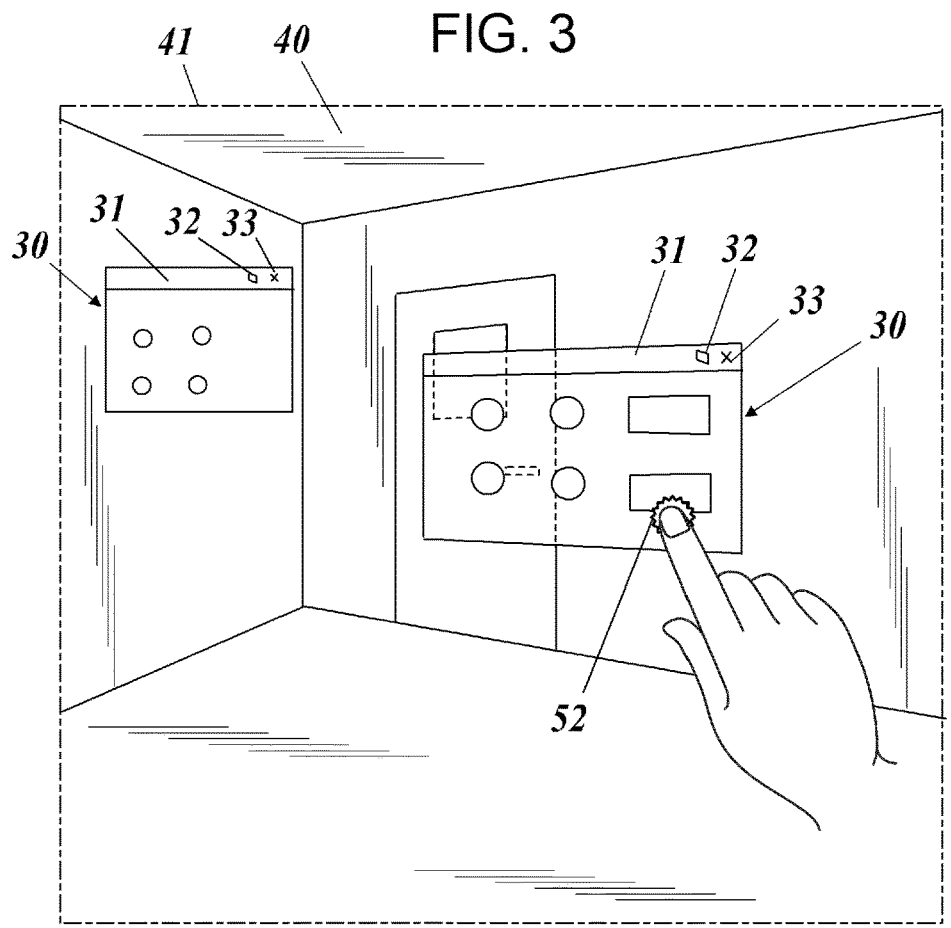
FIG. 3 is a diagram illustrating an example of a visible region and a virtual image visually recognized by the user wearing the wearable terminal apparatus.

As illustrated in FIGS. 2 and 3, when a virtual image 30 is displayed, the user visually recognizes the virtual image 30 disposed toward a predetermined direction at a predetermined position in a space 40. In the present embodiment, the space 40 is the real space visually recognized by the user through the visor 141. Since the virtual image 30 is projected onto the visor 141 having a light-transmitting property, the virtual image 30 is visually recognized as a translucent image superimposed on the real space. In FIGS. 2 and 3, the virtual image 30 is illustrated as a planar window screen. However, the virtual image 30 is not limited to this, and may be various stereoscopic images, for example. When the virtual image 30 is a window screen, the virtual image 30 has a front side and a back side. Among these sides, necessary information is displayed on the front side, and no information is usually displayed on the back side.

Figure 4:
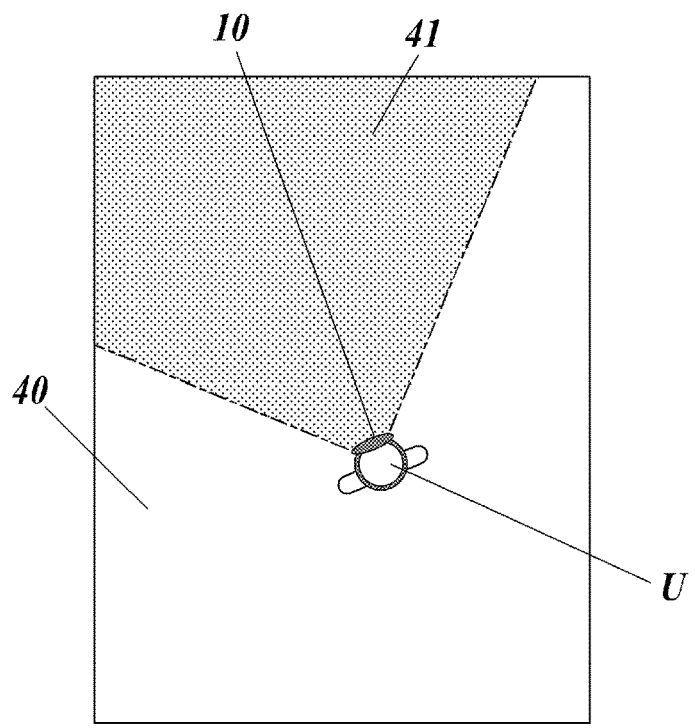
FIG. 4 is a diagram for describing the visible region in a space.

The wearable terminal apparatus 10 detects a visible region 41 of the user, based on a position and an orientation of the user in the space 40 (in other words, a position and an orientation of the wearable terminal apparatus 10). As illustrated in FIG. 4, the visible region 41 is a region located in front of a user U wearing the wearable terminal apparatus 10 in the space 40. For example, the visible region 41 is a region within a predetermined angle range in each of a left-right direction and an up-down direction with respect to the front of the user U. In this case, when a solid corresponding to the shape of the visible region 41 is cut along a plane perpendicular to the front direction of the user U, the cut surface has a quadrangular shape. Note that the shape of the visible region 41 may be determined such that the cut surface has a shape other than the quadrangular shape (such as a circular shape or elliptic shape, for example). The shape of the visible region 41 (for example, angle ranges in the left-right direction and the up-down direction with respect to the front) can be identified using a following method, for example.

The wearable terminal apparatus 10 performs field-of-view adjustment (hereinafter, referred to as calibration) in a predetermined procedure at a predetermined timing such as at the initial startup. By this calibration, a range visually recognizable by the user is identified. Thereafter, the virtual image 30 is displayed within this range. The shape of the visually recognizable range identified by this calibration can be set as the shape of the visible region 41.

The calibration is not limited to calibration performed in the predetermined procedure described above. The calibration may be automatically performed while the wearable terminal apparatus 10 performs a normal operation. For example, when there is no reaction on a display to which a reaction is to be made by the user, the wearable terminal apparatus 10 may regard the display range as being outside the range of the field of view of the user and adjust the field of view (and the shape of the visible region 41). When there is a reaction from the user on a display that is experimentally made at a position determined to be outside the range of the field of view, the wearable terminal apparatus 10 may regard the display range as being inside the range of the field of view of the user and adjust the field of view (and the shape of the visible region 41).

Note that the shape of the visible region 41 may be determined and fixed in advance at the time of shipment or the like irrespective of the adjustment result of the field of view. For example, the shape of the visible region 41 may be determined to be a maximum displayable range in terms of the optical design of a display unit 14.

In response to a predetermined user operation, the virtual image 30 is generated with a determined display position and a determined orientation in the space 40. The wearable terminal apparatus 10 projects and displays, onto the visor 141, the virtual image 30 whose display position is determined to be inside the visible region 41 among the generated virtual images 30. FIGS. 2 and 3 illustrate the visible region 41 using a chain line.

The display position and the orientation of the virtual image 30 on the visor 141 are updated in real time in accordance with a change of the visible region 41 of the user. That is, the display position and the orientation of the virtual image 30 change in accordance with the change of the visible region 41 so that the user recognizes that "the virtual image 30 is located at the set position and in the set orientation in the space 40". For example, when the user moves from the front side to the back side of the virtual image 30, the shape (angle) of the displayed virtual image 30 gradually changes in accordance with this movement. When the user moves to the back side of the virtual image 30 and then faces toward the virtual image 30, the back side is displayed so that the back side of the virtual image 30 is visually recognized. In response to the change of the visible region 41, the virtual image 30 whose display position becomes out of the visible region 41 is no longer displayed, and if there is the virtual image 30 whose display position enters the visible region 41, the virtual image 30 is newly displayed.

As illustrated in FIG. 2, when the user stretches their hand (or finger) forward, the wearable terminal apparatus 10 detects the stretching direction of the hand, and displays a virtual line 51 extending in the direction and a pointer 52 on the display surface of the visor 141, which are visually recognized by the user. The pointer 52 is displayed at an intersection of the virtual line 51 and the virtual image 30. When the virtual line 51 does not intersect with the virtual image 30, the pointer 52 may be displayed at an intersection of the virtual line 51 with a wall surface or the like in the space 40. On the other hand, as illustrated in FIG. 3, when a distance between the user's hand and the virtual image 30 is within a predetermined reference distance, display of the virtual line 51 may be omitted and the pointer 52 may be directly displayed at a position corresponding to the position of the fingertip of the user.

The user can adjust the direction of the virtual line 51 and the position of the pointer 52 by changing the stretching direction of the hand. The user performs a predetermined gesture after adjusting the pointer 52 to be located at a predetermined operation target (such as a function bar 31, a window shape change button 32, or a close button 33, for example) included in the virtual image 30. The wearable terminal apparatus 10 detects this gesture. Thus, the user can perform a predetermined operation on the operation target. For example, by performing a gesture (for example, a pinch gesture with fingers) of selecting an operation target with the pointer 52 placed at the close button 33, the user can close (delete) the virtual image 30. By performing the selecting gesture with the pointer 52 placed at the function bar 31 and performing a gesture of moving the hand forward, backward, leftward, and rightward in the selected state, the user can move the virtual image 30 in a depth direction and a left-right direction. The operations performed on the virtual image 30 are not limited these operations.

As described above, the wearable terminal apparatus 10 according to the present embodiment can implement a visual effect as if the virtual image 30 were present in the real space and can accept a user operation on the virtual image 30 and reflect the user operation on the display of the virtual image 30. That is, the wearable terminal apparatus 10 according to the present embodiment provides MR.

A functional configuration of the wearable terminal apparatus 10 is described with reference to FIG. 5.

The wearable terminal apparatus 10 includes a central processing unit (CPU) 11, a random access memory (RAM) 12, a storage unit 13, the display unit 14, a sensor unit 15, and a communication unit 16. These components are connected to one another by a bus 17. The components except for the visor 141 of the display unit 14 among the components illustrated in FIG. 5 are built in the body 10a and operate by electric power supplied from a battery also built in the body 10a.

The CPU 11 is a processor that performs various kinds of arithmetic processing and integrally controls operations of the components of the wearable terminal apparatus 10. The CPU 11 reads and executes a program 131 stored in the storage unit 13 to perform various control operations. The CPU 11 executes the program 131 to perform a visible region detection process and a display control process, for example. Among these processes, the visible region detection process is a process of detecting the visible region 41 of the user in the space 40. The display control process is a process of causing the display unit 14 to display the virtual image 30 whose position is determined to be inside the visible region 41 among the virtual images 30 whose positions in the space 40 are determined.

Figure 5:
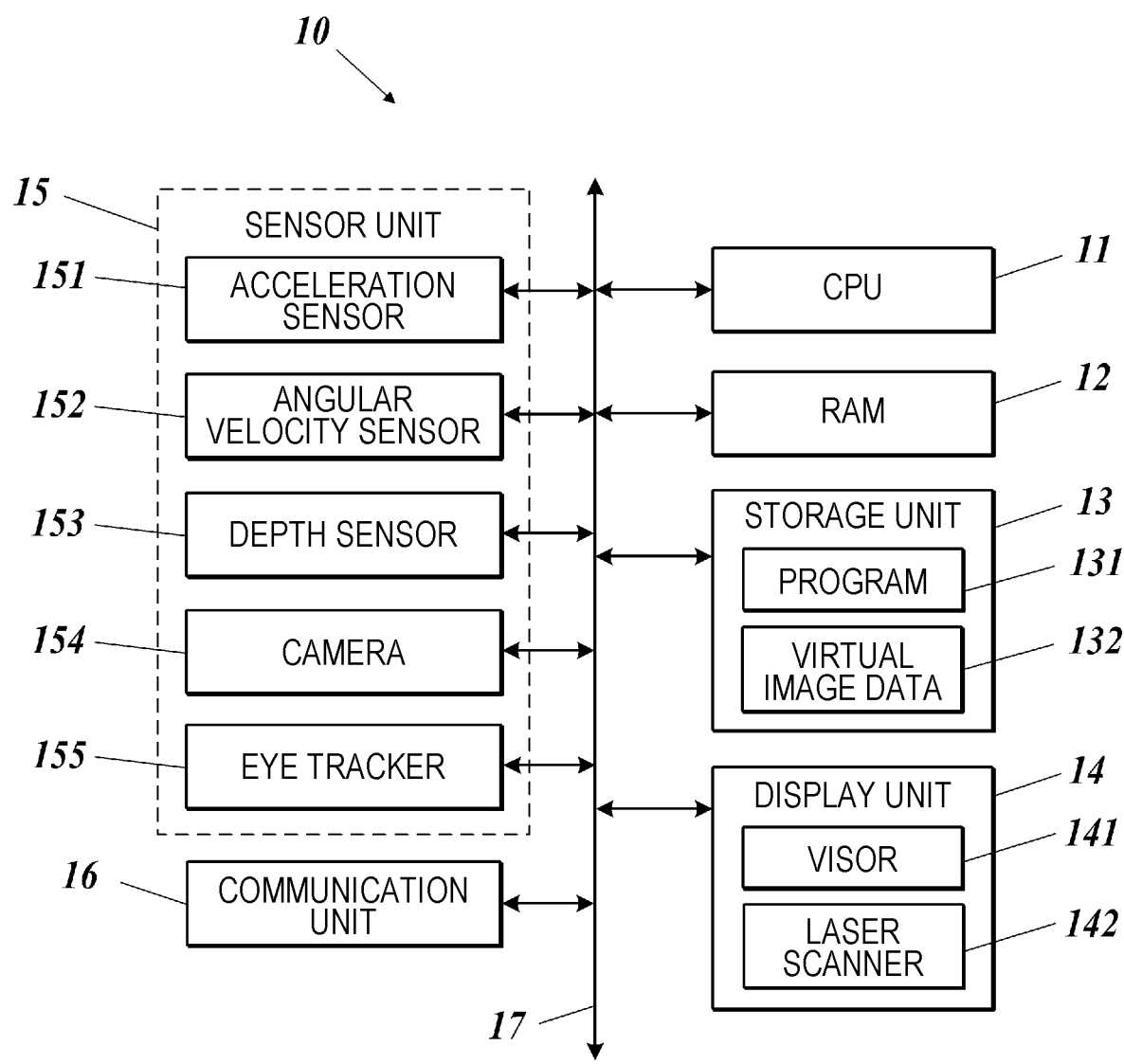
FIG. 5 is a block diagram illustrating a major functional configuration of the wearable terminal apparatus.

Although FIG. 5 illustrates a single CPU 11, the configuration is not limited to this configuration. Two or more processors such as CPUs may be provided. These two or more processors may perform in a distributed manner the processes performed by the CPU 11 in the present embodiment.

The RAM 12 provides a working memory space for the CPU 11 and stores temporary data.

The storage unit 13 is a non-transitory recording medium readable by the CPU 11 which is a computer. The storage unit 13 stores the program 131 to be executed by the CPU 11, various kinds of setting data, and so on. The program 131 is stored in the storage unit 13 in a form of a computer-readable program code. Examples of the storage unit 13 to be used include a nonvolatile storage device such as a solid state drive (SSD) including a flash memory.

Data stored in the storage unit 13 includes virtual image data 132 related to the virtual image 30. The virtual image data 132 includes data (for example, image data) related to display content of the virtual image 30, data of a display position, and data of an orientation.

The display unit 14 includes the visor 141, the laser scanner 142, and an optical system that guides light output from the laser scanner 142 to the display surface of the visor 141. The laser scanner 142 irradiates the optical system with pulsed laser light, of which ON and OFF are controlled for each pixel in accordance with a control signal from the CPU 11, while performing a scan in a predetermined direction. The laser light incident to the optical system forms a display screen that is a two-dimensional pixel matrix on the display surface of the visor 141. A to-be-used system of the laser scanner 142 may be, but not limited to, a system of performing a scan with laser light by operating a mirror by micro electro mechanical systems (MEMS), for example. The laser scanner 142 includes three light-emitting units that emit laser light of red (R), green (G), and blue (B), for example. The display unit 14 projects light from these light-emitting units onto the visor 141, and thus can implement color display.

The sensor unit 15 includes an acceleration sensor 151, an angular velocity sensor 152, the depth sensor 153, the camera 154, and an eye tracker 155. Note that the sensor unit 15 may further include a sensor not illustrated in FIG. 5.

The acceleration sensor 151 detects an acceleration and outputs a detection result to the CPU 11. A translational motion of the wearable terminal apparatus 10 in three orthogonal axial directions can be detected from the detection result obtained by the acceleration sensor 51.

The angular velocity sensor 152 (gyro sensor) detects an angular velocity and outputs a detection result to the CPU 11. A rotational motion of the wearable terminal apparatus 10 can be detected from the detection result obtained by the angular velocity sensor 152.

The depth sensor 153 is an infrared camera that detects a distance to a subject by a time of flight (ToF) method, and outputs a detection result of the distance to the CPU 11. The depth sensor 153 is provided on the front surface of the body 10a to be able to image the visible region 41. Each time the position and the orientation of the user change in the space 40, the depth sensor 153 repeatedly performs measurement. By combining the results, three-dimensional mapping of the entire space 40 can be performed (that is, a three-dimensional structure can be acquired).

The camera 154 images the space 40 with a group of RGB imaging elements, acquires color image data as an imaging result, and outputs the color image data to the CPU 11. The camera 154 is provided on the front surface of the body 10a to be able to image the visible region 41. The output image from the camera 154 is used to detect the position, the orientation, and the like of the wearable terminal apparatus 10. The output image is also transmitted from the communication unit 16 to an external device and is used to display the visible region 41 of the user of the wearable terminal apparatus 10 on the external device.

The eye tracker 155 detects the line of sight of the user and outputs a detection result to the CPU 11. The method of detecting the line of sight to be used may be, but not limited to, a method in which reflection points of near-infrared light in the eyes of the user are imaged by an eye tracking camera and the imaging result and an image obtained by the camera 154 are analyzed to identify the target visually recognized by the user, for example. A part of the configuration of the eye tracker 155 may be provided in a peripheral portion or the like of the visor 141.

The communication unit 16 is a communication module including an antenna, a modulation/demodulation circuit, and a signal processing circuit. The communication unit 16 transmits and receives data to and from an external device by wireless communication in accordance with a predetermined communication protocol.

In the wearable terminal apparatus 10 thus configured, the CPU 11 performs control operations below.

The CPU 11 performs three-dimensional mapping of the space 40, based on the distance data to the subject input from the depth sensor 153. The CPU 11 repeatedly performs this three-dimensional mapping each time the position and the orientation of the user change, and updates the result each time. The CPU 11 performs three-dimensional mapping in units of the continuous space 40. Thus, when the user moves between multiple rooms partitioned by a wall or the like, the CPU 11 recognizes each room as one space 40 and performs three-dimensional mapping separately for each room.

The CPU 11 detects the visible region 41 of the user in the space 40. Specifically, the CPU 11 identifies the position and the orientation of the user (the wearable terminal apparatus 10) in the space 40, based on the detection results obtained by the acceleration sensor 151, the angular velocity sensor 152, the depth sensor 153, the camera 154, and the eye tracker 155 and the accumulated three-dimensional mapping results. The CPU 11 then detects (identifies) the visible region 41, based on the identified position and the orientation and the predetermined shape of the visible region 41. The CPU 11 continuously detects the position and the orientation of the user in real time, and updates the visible region 41 in conjunction with the change in the position and the orientation of the user. Note that the visible region 41 may be detected using the detection results of some of the acceleration sensor 151, the angular velocity sensor 152, the depth sensor 153, the camera 154, and the eye tracker 155.

The CPU 11 generates the virtual image data 132 related to the virtual image 30 in response to a user operation. That is, in response to detecting a predetermined operation (gesture) for instructing generation of the virtual image 30, the CPU 11 identifies the display content (for example, image data), the display position, and the orientation of the virtual image, and generates the virtual image data 132 including date representing these identified results.

The CPU 11 causes the display unit 14 to display the virtual image 30 whose display position is determined to be inside the visible region 41. The CPU 11 identifies the virtual image 30 whose display position is determined to be inside the visible region 41, based on the information of the display position included in the virtual image data 132, and generates image data of a display screen to be displayed on the display unit 14, based on a positional relationship between the visible region 41 at that time point and the display position of the identified virtual image 30. Based on this image data, the CPU 11 causes the laser scanner 142 to perform a scan operation to form the display screen including the identified virtual image 30 on the display surface of the visor 141. That is, the CPU 11 causes the virtual image 30 to be displayed on the display surface of the visor 141, the virtual image 30 being visually recognized in the space 40 that is visually recognized through the visor 141. By continuously performing this display control process, the CPU 11 updates the display content on the display unit 14 in real time in accordance with the movement of the user (change in the visible region 41). When a setting is made to hold the virtual image data 132 even in a power-off state of the wearable terminal apparatus 10, the existing virtual image data 132 is read in response to the next startup of the wearable terminal apparatus 10. If the virtual image 30 located inside the visible region 41 is present, the virtual image 30 is displayed on the display unit 14.

Note that the CPU 11 may generate the virtual image data 132 based on instruction data acquired from an external device via the communication unit 16, and may cause the virtual image 30 to be displayed based on the virtual image data 132. Alternatively, the CPU 11 may acquire the virtual image data 132 from an external device via the communication unit 16, and may cause the virtual image 30 to be displayed based on the virtual image data 132. For example, the CPU 11 may display a video from the camera 154 of the wearable terminal apparatus 10 on an external device operated by a remote instructor, may accept an instruction to display the virtual image 30 from the external device, and may cause the instructed virtual image 30 to be displayed on the display unit 14 of the wearable terminal apparatus 10. This enables an operation in which the virtual image 30 indicating work content is displayed near a work target object and the remote instructor instructs the user of the wearable terminal apparatus 10 to perform work, for example.

The CPU 11 detects the position and the orientation of the user's hand (and/or finger) based on the images obtained by the depth sensor 153 and the camera 154, and causes the display unit 14 to display the virtual line 51 extending in the detected direction and the pointer 52. The CPU 11 detects a gesture of the user's hand (and/or finger) based on the images obtained by the depth sensor 153 and the camera 154, and performs a process in accordance with the content of the detected gesture and the position of the pointer 52 at that time point.

An operation of the wearable terminal apparatus 10 when the virtual image 30 is located inside the visible region 41 is described.

As described above, in the wearable terminal apparatus 10, the virtual image 30 whose display position is determined to be inside the visible region 41 is displayed on the display unit 14 to be visually recognized by the user. Thus, when the display position of the virtual image 30 of the window screen is determined to be a high position, a low position, or the like, the display position of the function bar 31 included in the virtual image 30 is away from the user. This makes it difficult for the user to operate the function bar 31.

Accordingly, the CPU 11 of the wearable terminal apparatus 10 according to the present embodiment changes the display position of the function bar 31 included in the virtual image 30 when a predetermined condition is satisfied. This can make the operation of the function bar 31 included in the virtual image 30 easier. How the display position of the function bar 31 included in the virtual image 30 is changed is described below with reference to FIGS. 6 to 15.

A control procedure of a virtual image display process according to an aspect of the present disclosure performed by the CPU 11 is described with reference to a flowchart of FIG. 6. The virtual image display process of FIG. 6 at least includes changing the display position of the function bar 31 included in the virtual image 30 when a predetermined condition is satisfied.

Figure 6:
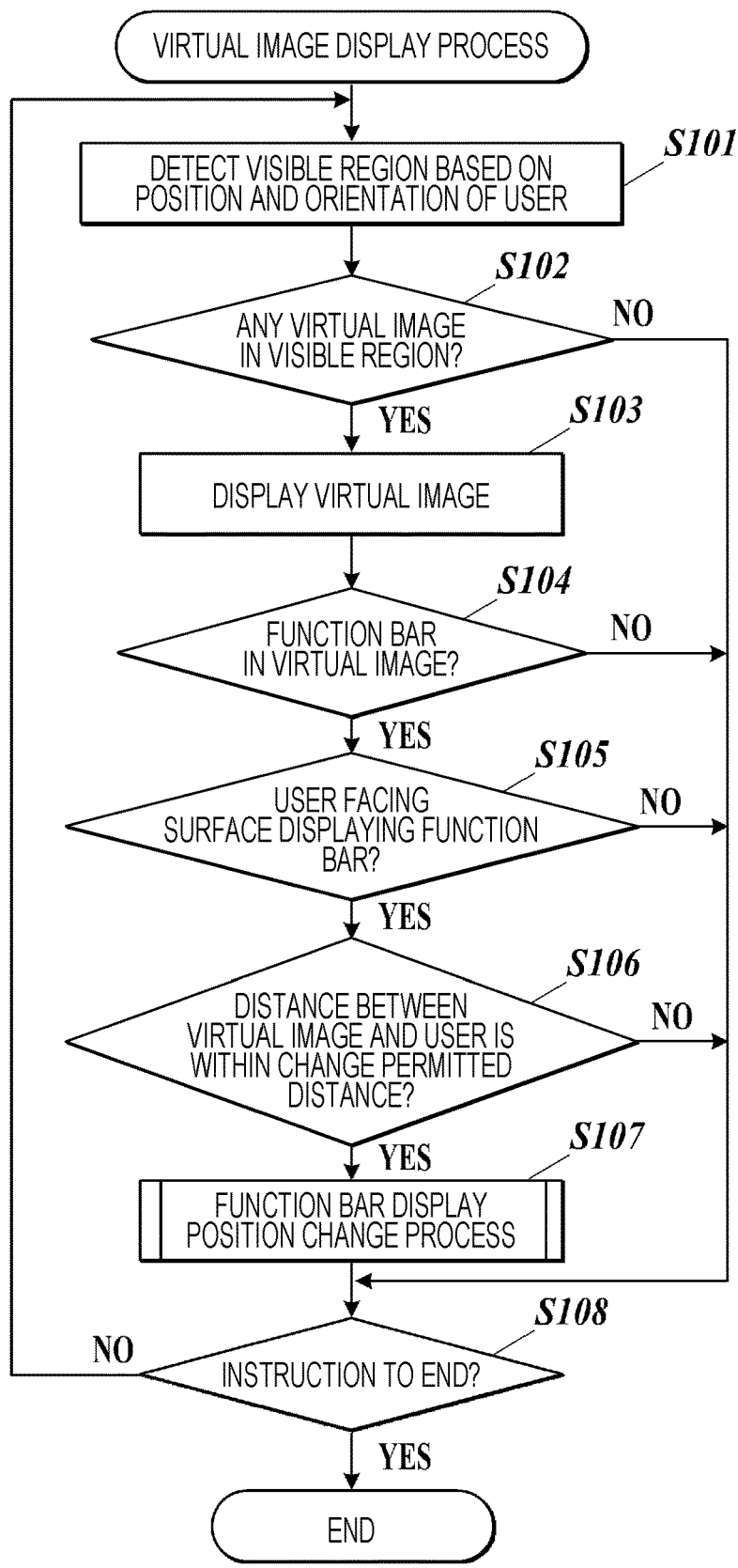
FIG. 6 is a flowchart illustrating a control procedure of a virtual image display process.

In response to the start of the virtual image display process illustrated in FIG. 6, the CPU 11 detects the visible region 41, based on a position and an orientation of the user (step S101).

The CPU 11 then determines whether the virtual image 30 whose display position is determined to be inside the detected visible region 41 is present (step S102).

If the CPU 11 determines in step S102 that the virtual image 30 whose display position is determined to be inside the detected visible region 41 is not present (NO in step S102), the process proceeds to step S108.

If the CPU 11 determines in step S102 that the virtual image 30 whose display position is determined to be inside the detected visible region 41 (YES in step S102), the CPU 11 causes the display unit 14 to display the virtual image 30 (step S103).

The CPU 11 then determines whether the virtual image 30 displayed on the display unit 14 includes the function bar 31 (step S104).

If the CPU 11 determines in step S104 that the virtual image 30 displayed on the display unit 14 does not include the function bar 31 (NO in step S104), the process proceeds to step S108.

If the CPU 11 determines in step S104 that the virtual image 30 displayed on the display unit 14 includes the function bar 31 (YES in step S104), the CPU 11 determines whether the user is facing a surface of the virtual image 30 displaying the function bar 31 (step S105).

If the CPU 11 determines in step S105 that the user is not facing the surface of the virtual image 30 displaying the function bar 31, that is, the user is facing the back side of the virtual image 30 (NO in step S105), the process proceeds to step S108.

If the CPU 11 determines in step S105 that the user is facing the surface of the virtual image 30 displaying the function bar 31 (YES in step S105), the CPU 11 determines whether a distance between the virtual image 30 and the user is less than or equal to a predetermined change permitted distance (step S106). The change permitted distance is a reference distance used to determine whether to permit changing of the display position of the function bar 31. This change permitted distance is, for example, a distance within which the user can virtually touch the virtual image 30.

If the CPU 11 determines in step S106 that the distance between the virtual image 30 and the user is not less than or equal to the predetermined change permitted distance (NO in step S106), the process proceeds to step S108.

If the CPU 11 determines in step S106 that the distance between the virtual image 30 and the user is less than or equal to the predetermined change permitted distance (YES in step S106), the CPU 11 performs a function bar display position change process (step S107). The process then proceeds to step S108. Details of the function bar display position change process is described below.

The CPU 11 then determines whether an instruction to end the display operation of the wearable terminal apparatus 10 is given (step S108).

If the CPU 11 determines in step S108 that an instruction to end the display operation of the wearable terminal apparatus 10 is not given (NO in step S108), the process returns to step S101 and the CPU 11 repeatedly performs the following processing.

If the CPU 11 determines in step S108 that an instruction to end the display operation of the wearable terminal apparatus 10 is given (YES in step S108), the CPU 11 ends the virtual image display process.

Figure 7:
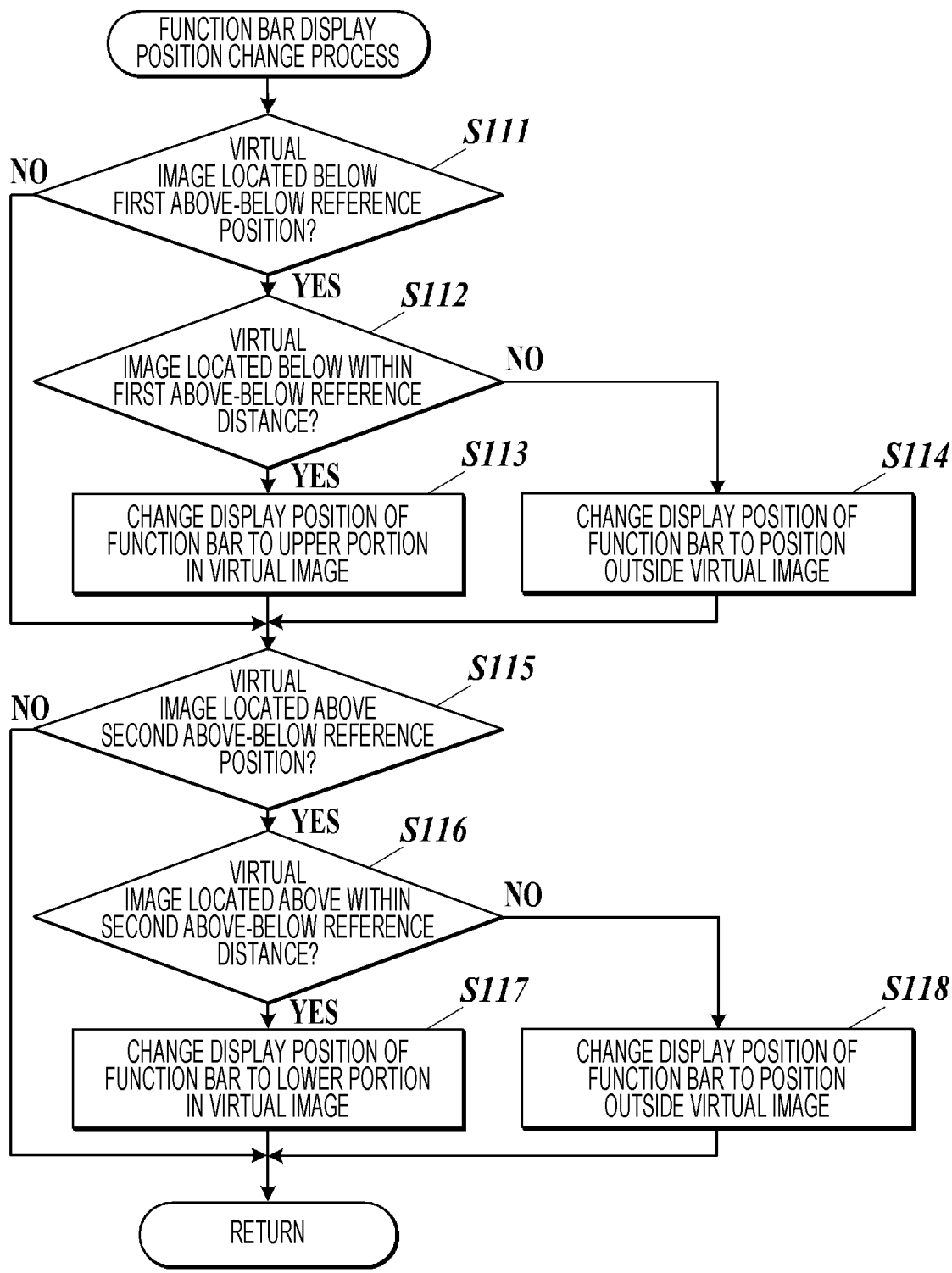
FIG. 7 is a flowchart illustrating a control procedure of a function bar display position change process.

A control procedure of the function bar display position change process performed by the CPU 11 is described with reference to a flowchart of FIG. 7.

In response to the start of the function bar display position change process illustrated in FIG. 7, the CPU 11 determines whether the virtual image 30 displayed on the display unit 14 is located below a first above-below reference position P1 (step S111). The first above-below reference position P1 is a reference position used to determine whether to change the display position of the function bar 31 to an upper position, and is a position at a height of the wearable terminal 10 when the determination processing of step S111 is performed, for example. The display position of the virtual image 30 is determined based on a position and an orientation of the wearable terminal apparatus 10 identified from various detection results obtained by the sensor unit 15. Whether the virtual image 30 is located below the first above-below reference position P1 is determined using an upper end of the virtual image 30 as the reference, for example.

If the CPU 11 determines in step S111 that the virtual image 30 is not located below the first above-below reference position P1 (NO in step S111), the process proceeds to step S115.

If the CPU 11 determines in step S111 that the virtual image 30 is located below the first above-below reference position P1 (YES in step S111), the CPU 11 determines whether the virtual image 30 is located below the first above-below reference position P1 by a first above-below reference distance L1 or less (step S112). The first above-below reference distance L1 is a reference distance used to determine whether to change the display position of the function bar 31 in the virtual image 30 or to the position outside the virtual image 30.

Figure 8:
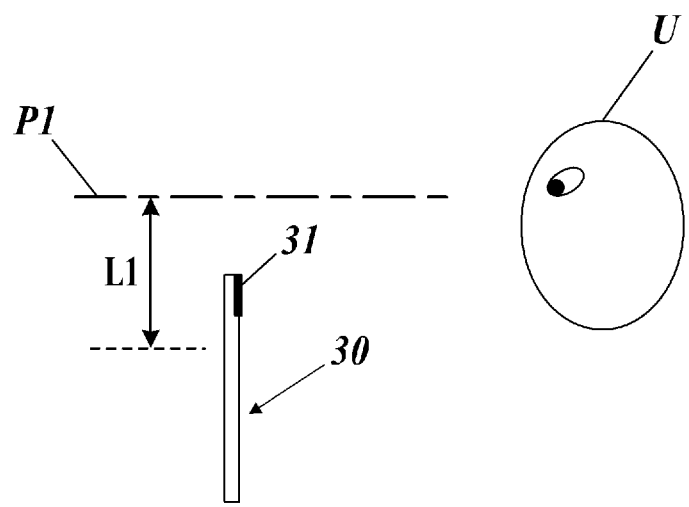
FIG. 8 is a diagram illustrating an example of changing a display position of a function bar to an upper portion in a virtual image.
Figure 9:
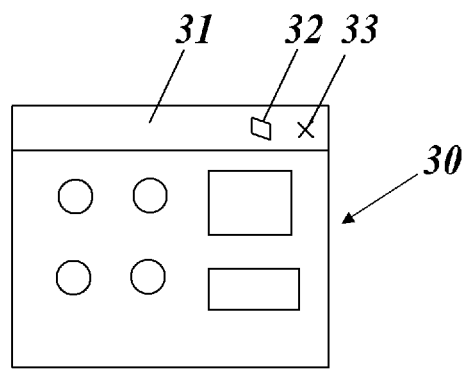
FIG. 9 is a diagram illustrating an example of the virtual image when the display position of the function bar is changed to the upper portion in the virtual image.

If the CPU 11 determines in step S112 that the virtual image 30 is located below the first above-below reference position P1 by the first above-below reference distance L1 or less (YES in step S112), the CPU 11 changes the display position of the function bar 31 to an upper portion in the virtual image 30 as illustrated in FIGS. 8 and 9 (step S113). Note that in such a case, the default display position of the function bar 31 is in a lower portion in the virtual image 30, for example. The CPU 11 then cause the process to proceed to step S115. FIG. 8 is a diagram illustrating an example of changing the display position of the function bar 31 to an upper portion in the virtual image 30. FIG. 9 is a diagram illustrating an example of the virtual image 30 when the display position of the function bar 31 is changed to the upper portion in the virtual image 30.

Figure 10:
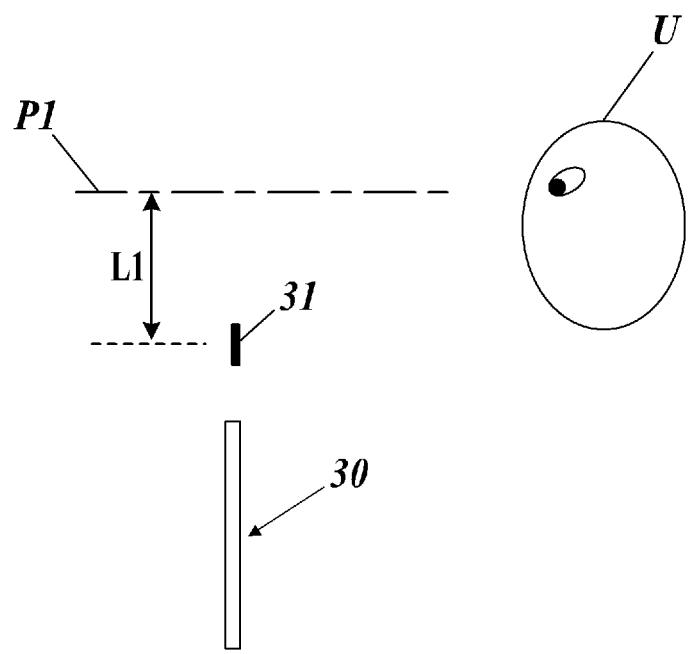
FIG. 10 is a diagram illustrating an example of changing the display position of the function bar to a position outside the virtual image.
Figure 11:
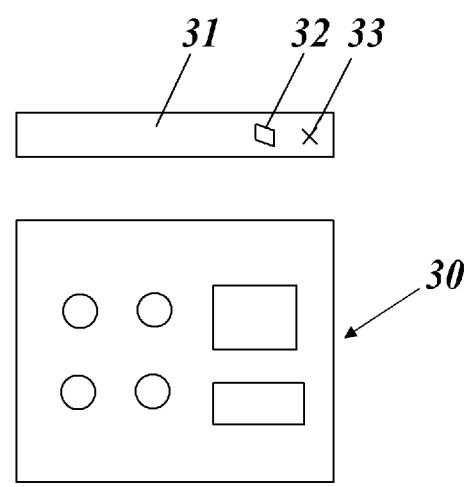
FIG. 11 is a diagram illustrating an example of the virtual image when the display position of the function bar is changed to the position outside the virtual image.

If the CPU 11 determines in step S112 that the virtual image 30 is not located below the first above-below reference position P1 by the first above-below reference distance L1 or less (NO in step S112), the CPU 11 changes the display position of the function bar 31 to a position outside the virtual image 30 (step S114). Specifically, as illustrated in FIGS. 10 and 11, the CPU 11 changes the display position of the function bar 31 to a predetermined upper position independent from the virtual image 30. The CPU 11 then cause the process to proceed to step S115. FIG. 10 is a diagram illustrating an example of changing the display position of the function bar 31 to the position outside the virtual image 30. FIG. 11 is a diagram illustrating an example of the virtual image 30 when the display position of the function bar 31 is changed to the position outside the virtual image 30. Note that when the display position of the function bar 31 is changed to the predetermined upper position independent from the virtual image 30, the function bar 31 and the virtual image 30 may be displayed in a display style indicating that the function bar 31 and the virtual image 30 have a correspondence (for example, a style in which the function bar 31 and the virtual image 30 have outer frames of the same color or a style in which the function bar 31 and the virtual image 30 are linked by a line).

The CPU 11 then determines whether the virtual image 30 is located above a second above-below reference position P2 (step S115). The second above-below reference position P2 is a reference position used to determine whether to change the display position of the function bar 31 to a lower position, and is a position at a height of the wearable terminal 10 when the determination processing of step S115 is performed, for example. Whether the virtual image 30 is located above the second above-below reference position P2 is determined using a lower end of the virtual image 30 as the reference, for example.

If the CPU 11 determines in step S115 that the virtual image 30 is not located above the second above-below reference position P2 (NO in step S115), the process returns to the virtual image display process (see FIG. 6).

If the CPU 11 determines in step S115 that the virtual image 30 is located above the second above-below reference position P2 (YES in step S115), the CPU 11 determines whether the virtual image 30 is located above the second above-below reference position P2 by a second above-below reference distance L2 or less (step S116). The second above-below reference distance L2 is a reference distance used to determine whether to change the display position of the function bar 31 in the virtual image 30 or to the position outside the virtual image 30. Note that the first above-below reference distance L1 and the second above-below reference distance L2 may be the same distance or distances different from each other.

Figure 12:
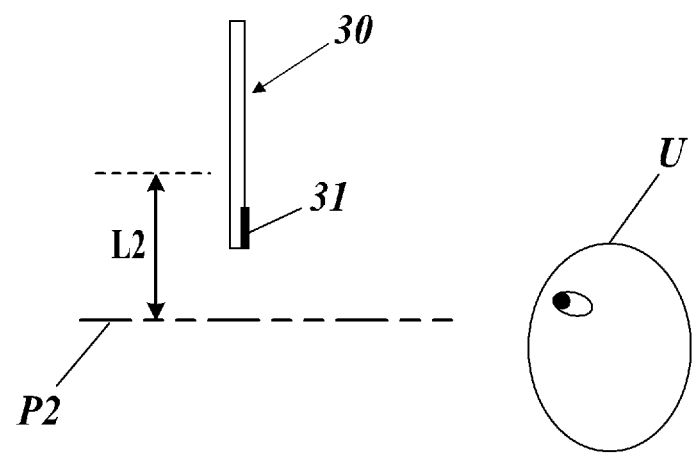
FIG. 12 is a diagram illustrating an example of changing the display position of the function bar to a lower portion in the virtual image.
Figure 13:
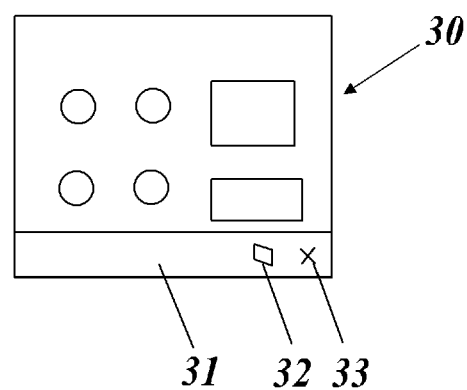
FIG. 13 is a diagram illustrating an example of the virtual image when the display position of the function bar is changed to the lower portion in the virtual image.

If the CPU 11 determines in step S116 that the virtual image 30 is located above the second above-below reference position P2 by the second above-below reference distance L2 or less (YES in step S116), the CPU 11 changes the display position of the function bar 31 to a lower portion in the virtual image 30 as illustrated in FIGS. 12 and 13 (step S117). Note that in such a case, the default display position of the function bar 31 is in an upper portion in the virtual image 30, for example. The CPU 11 then returns the process to the virtual image display process (see FIG. 6). FIG. 12 is a diagram illustrating an example of changing the display position of the function bar 31 to a lower portion in the virtual image 30. FIG. 13 is a diagram illustrating an example of the virtual image 30 when the display position of the function bar 31 is changed to the lower portion in the virtual image 30.

Figure 14:
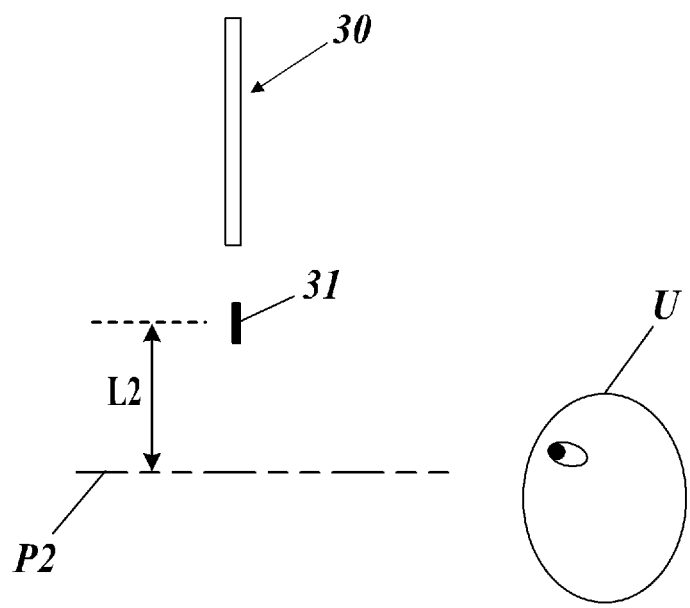
FIG. 14 is a diagram illustrating an example of changing the display position of the function bar to a position outside the virtual image.
Figure 15:
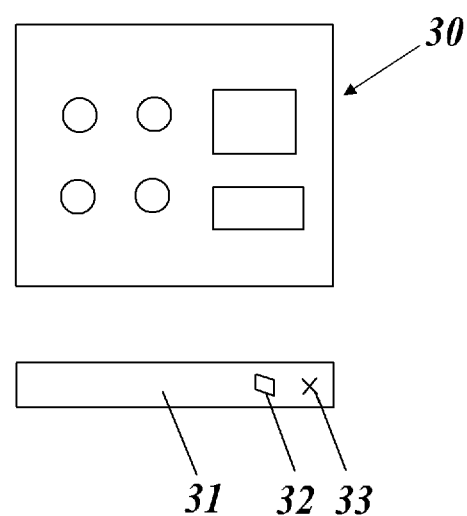
FIG. 15 is a diagram illustrating an example of the virtual image when the display position of the function bar is changed to the position outside the virtual image.

If the CPU 11 determines in step S116 that the virtual image 30 is not located above the second above-below reference position P2 by the second above-below reference distance L2 or less (NO in step S116), the CPU 11 changes the display position of the function bar 31 to a position outside the virtual image 30 (step S118). Specifically, as illustrated in FIGS. 14 and 15, the CPU 11 changes the display position of the function bar 31 to a lower position independent from the virtual image 30. The CPU 11 then returns the process to the virtual image display process (see FIG. 6). FIG. 14 is a diagram illustrating an example of changing the display position of the function bar 31 to a position outside the virtual image 30. FIG. 15 is a diagram illustrating an example of the virtual image 30 when the display position of the function bar 31 is changed to the position outside the virtual image 30. Note that when the display position of the function bar 31 is changed to the predetermined lower position independent from the virtual image 30, the function bar 31 and the virtual image 30 may be displayed in a display style indicating that the function bar 31 and the virtual image 30 have a correspondence (for example, a style in which the function bar 31 and the virtual image 30 have outer frames of the same color or a style in which the function bar 31 and the virtual image 30 are linked by a line).

First Variation

A first variation of the wearable terminal apparatus 10 is described. The first variation is different from the first embodiment in that the display position of the function bar 31 is changed to a leftward or rightward position of the virtual image 30. Differences from the first embodiment are described below, and description of common points is omitted. Description is given below of the vertical function bar 31.

Figure 16:
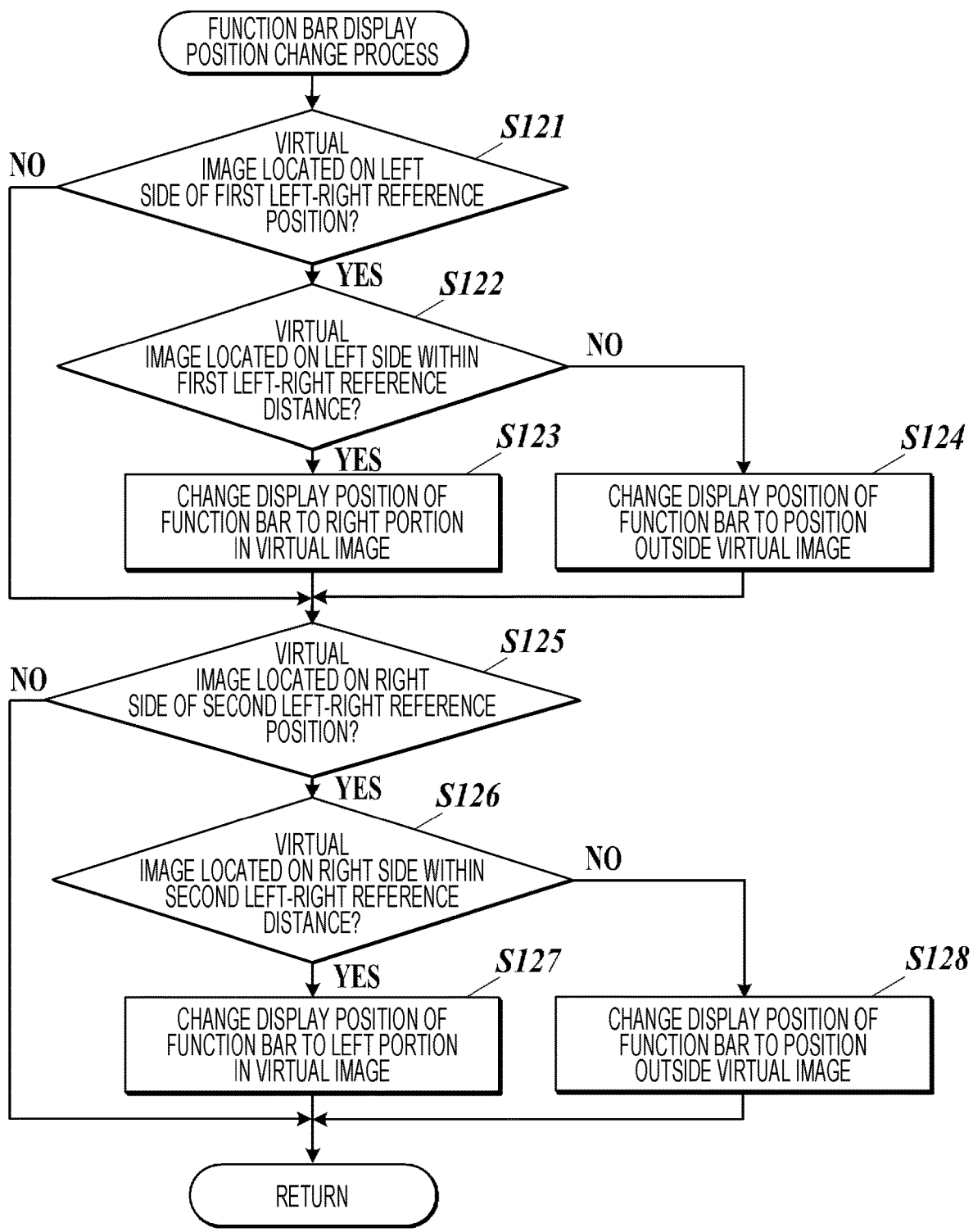
FIG. 16 is a flowchart illustrating a control procedure of a function bar display position change process according to a first variation.

FIG. 16 is a flowchart illustrating a control procedure of a function bar display position change process according to the first variation.

In response to the start of the function bar display position change process illustrated in FIG. 16, the CPU 11 determines whether the virtual image 30 displayed on the display unit 14 is located on the left side of a first left-right reference position P3 (step S121). The first left-right reference position P3 is a reference position (boundary) used to determine whether to change the display position of the function bar 31 to a rightward position, and is a line segment indicating an orientation (direction) of the wearable terminal 10 when the determination processing of step S121 is performed, for example. Whether the virtual image 30 is located on the left side of the first left-right reference position P3 is determined using a right end of the virtual image 30 as the reference, for example.

If the CPU 11 determines in step S121 that the virtual image 30 is not located on the left side of the first left-right reference position P3 (NO in step S121), the process proceeds to step S125.

If the CPU 11 determines in step S121 that the virtual image 30 is located on the left side of the first left-right reference position P3 (YES in step S121), the CPU 11 determines whether the virtual image 30 is located on the left side of the first left-right reference position P3 by a first left-right reference distance L3 or less (step S122). The first left-right reference distance L3 is a reference distance used to determine whether to change the display position of the function bar 31 in the virtual image 30 or to the position outside the virtual image 30.

Figure 17:
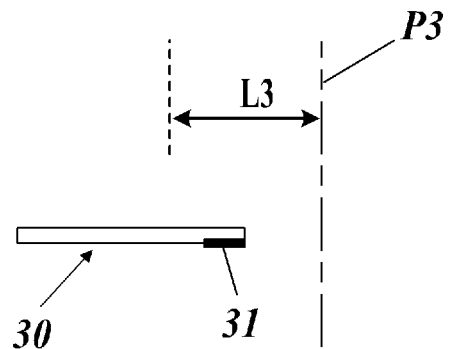
FIG. 17 is a diagram illustrating an example of changing the display position of the function bar to a right portion in the virtual image.
Figure 17:
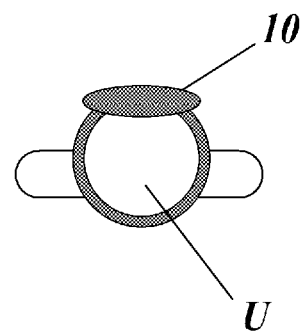
Figure 18:
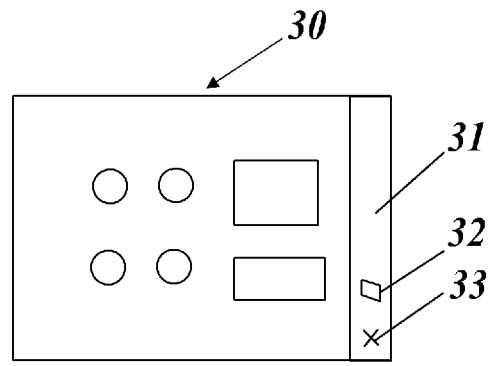
FIG. 18 is a diagram illustrating an example of the virtual image when the display position of the function bar is changed to the right portion in the virtual image.

If the CPU 11 determines in step S122 that the virtual image 30 is located on the left side of the first left-right reference position P3 by the first left-right reference distance L3 or less (YES in step S122), the CPU 11 changes the display position of the function bar 31 to a right portion in the virtual image 30 as illustrated in FIGS. 17 and 18 (step S123). Note that in such a case, the default display position of the function bar 31 is in a left portion in the virtual image 30, for example. The CPU 11 then causes the process to proceed to step S125. FIG. 17 is a diagram illustrating an example of changing the display position of the function bar 31 to a right portion in the virtual image 30. FIG. 18 is a diagram illustrating an example of the virtual image 30 when the display position of the function bar 31 is changed to the right portion in the virtual image 30.

Figure 19:
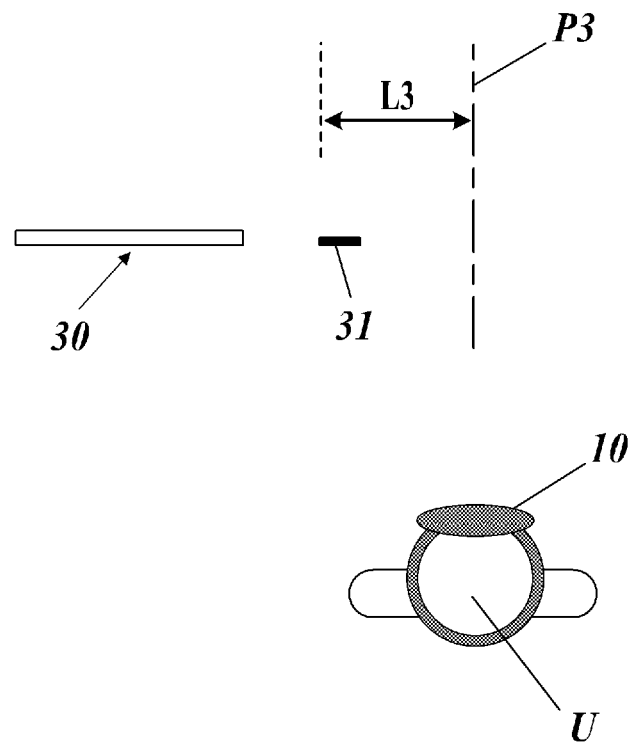
FIG. 19 is a diagram illustrating an example of changing the display position of the function bar to a position outside the virtual image.
Figure 20:
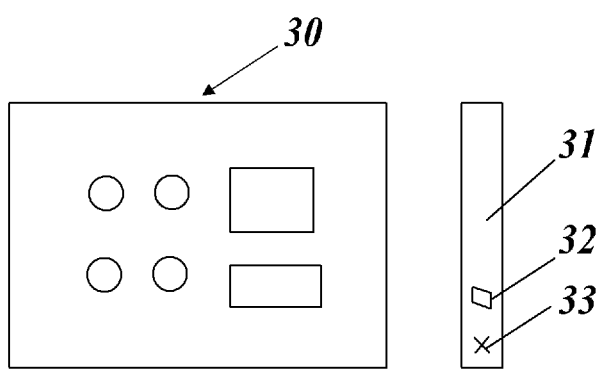
FIG. 20 is a diagram illustrating an example of the virtual image when the display position of the function bar is changed to the position outside the virtual image.

If the CPU 11 determines in step S122 that the virtual image 30 is not located on the left side of the first left-right reference position P3 by the first left-right reference distance L3 or less (NO in step S122), the CPU 11 changes the display position of the function bar 31 to a position outside the virtual image 30 (step S124). Specifically, as illustrated in FIGS. 19 and 20, the CPU 11 changes the display position of the function bar 31 to a predetermined right position independent from the virtual image 30. The CPU 11 then causes the process to proceed to step S125. FIG. 19 is a diagram illustrating an example of changing the display position of the function bar 31 to a position outside the virtual image 30. FIG. 20 is a diagram illustrating an example of the virtual image 30 when the display position of the function bar 31 is changed to the position outside the virtual image 30. Note that when the display position of the function bar 31 is changed to the predetermined right position independent from the virtual image 30, the function bar 31 and the virtual image 30 may be displayed in a display style indicating that the function bar 31 and the virtual image 30 have a correspondence (for example, a style in which the function bar 31 and the virtual image 30 have outer frames of the same color or a style in which the function bar 31 and the virtual image 30 are linked by a line).

The CPU 11 then determines whether the virtual image 30 is located on the right side of a second left-right reference position P4 (step S125). The second left-right reference position P4 is a reference position (boundary) used to determine whether to change the display position of the function bar 31 to a leftward position, and is a line segment indicating an orientation (direction) of the wearable terminal 10 when the determination processing of step S125 is performed, for example. Whether the virtual image 30 is located on the right side of the second left-right reference position P4 is determined using a left end of the virtual image 30 as the reference, for example.

If the CPU 11 determines in step S125 that the virtual image 30 is not located on the right side of the second left-right reference position P4 (NO in step S125), the process returns to the virtual image display process (see FIG. 6).

If the CPU 11 determines in step S125 that the virtual image 30 is located on the right side of the second left-right reference position P4 (YES in step S125), the CPU 11 determines whether the virtual image 30 is located on the right side of the second left-right reference position P4 by a second left-right reference distance L4 or less (step S126). The second left-right reference distance L4 is a reference distance used to determine whether to change the display position of the function bar 31 in the virtual image 30 or to the position outside the virtual image 30. Note that the first left-right reference distance L3 and the second left-right reference distance L4 may be the same distance or distances different from each other.

Figure 21:
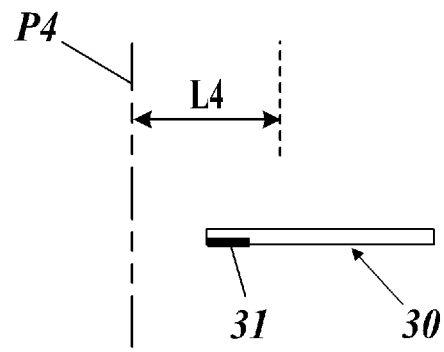
FIG. 21 is a diagram illustrating an example of changing the display position of the function bar to a left portion in the virtual image.
Figure 21:
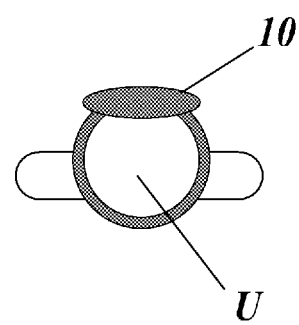
Figure 22:
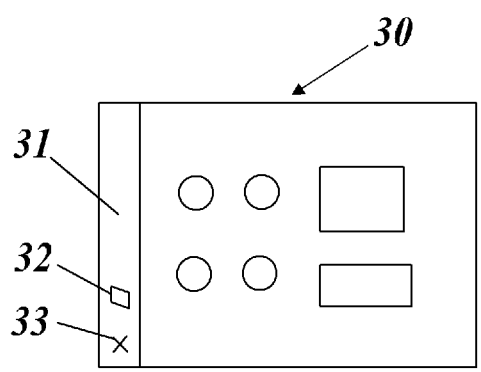
FIG. 22 is a diagram illustrating an example of the virtual image when the display position of the function bar is changed to the left portion in the virtual image.

If the CPU 11 determines in step S126 that the virtual image 30 is located on the right side of the second left-right reference position P4 by the second left-right reference distance L4 or less (YES in step S126), the CPU 11 changes the display position of the function bar 31 to a left portion in the virtual image 30 as illustrated in FIGS. 21 and 22 (step S127). Note that in such a case, the default display position of the function bar 31 is in a right portion in the virtual image 30, for example. The CPU 11 then returns the process to the virtual image display process (see FIG. 6). FIG. 21 is a diagram illustrating an example of changing the display position of the function bar 31 to a left portion in the virtual image 30. FIG. 22 is a diagram illustrating an example of the virtual image 30 when the display position of the function bar 31 is changed to the left portion in the virtual image 30.

Figure 23:
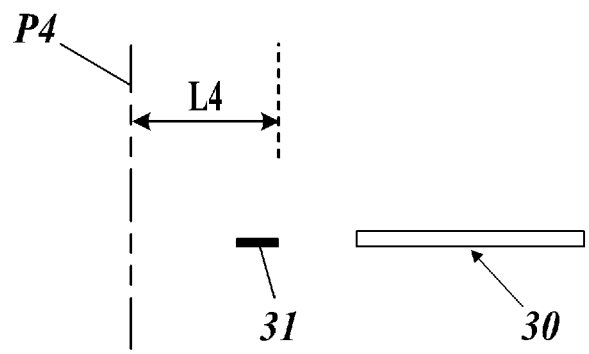
FIG. 23 is a diagram illustrating an example of changing the display position of the function bar to a position outside the virtual image.
Figure 23:
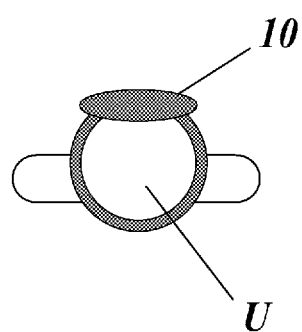
Figure 24:
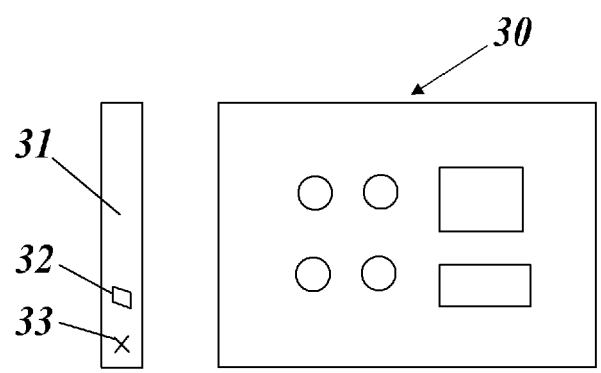
FIG. 24 is a diagram illustrating an example of the virtual image when the display position of the function bar is changed to the position outside the virtual image.

If the CPU 11 determines in step S126 that the virtual image 30 is not located on the right side of the second left-right reference position P4 by the second left-right reference distance L4 or less (NO in step S126), the CPU 11 changes the display position of the function bar 31 to a position outside the virtual image 30 (step S128). Specifically, as illustrated in FIGS. 23 and 24, the CPU 11 changes the display position of the function bar 31 to a predetermined left position independent from the virtual image 30. The CPU 11 then returns the process to the virtual image display process (see FIG. 6). FIG. 23 is a diagram illustrating an example of changing the display position of the function bar 31 to a position outside the virtual image 30. FIG. 24 is a diagram illustrating an example of the virtual image 30 when the display position of the function bar 31 is changed to the position outside the virtual image 30. Note that when the display position of the function bar 31 is changed to the predetermined left position independent from the virtual image 30, the function bar 31 and the virtual image 30 may be displayed in a display style indicating that the function bar 31 and the virtual image 30 have a correspondence (for example, a style in which the function bar 31 and the virtual image 30 have outer frames of the same color or a style in which the function bar 31 and the virtual image 30 are linked by a line).

Second Variation

A second variation of the wearable terminal apparatus 10 is described. The second variation is different from the first embodiment and the first variation in that the display position of the function bar 31 in a front direction of the virtual image 30 is changed to an independent position closer to the user than the display position of the virtual image 30. Differences from the first embodiment and the first variation are described below, and description of common points is omitted.

Figure 25:
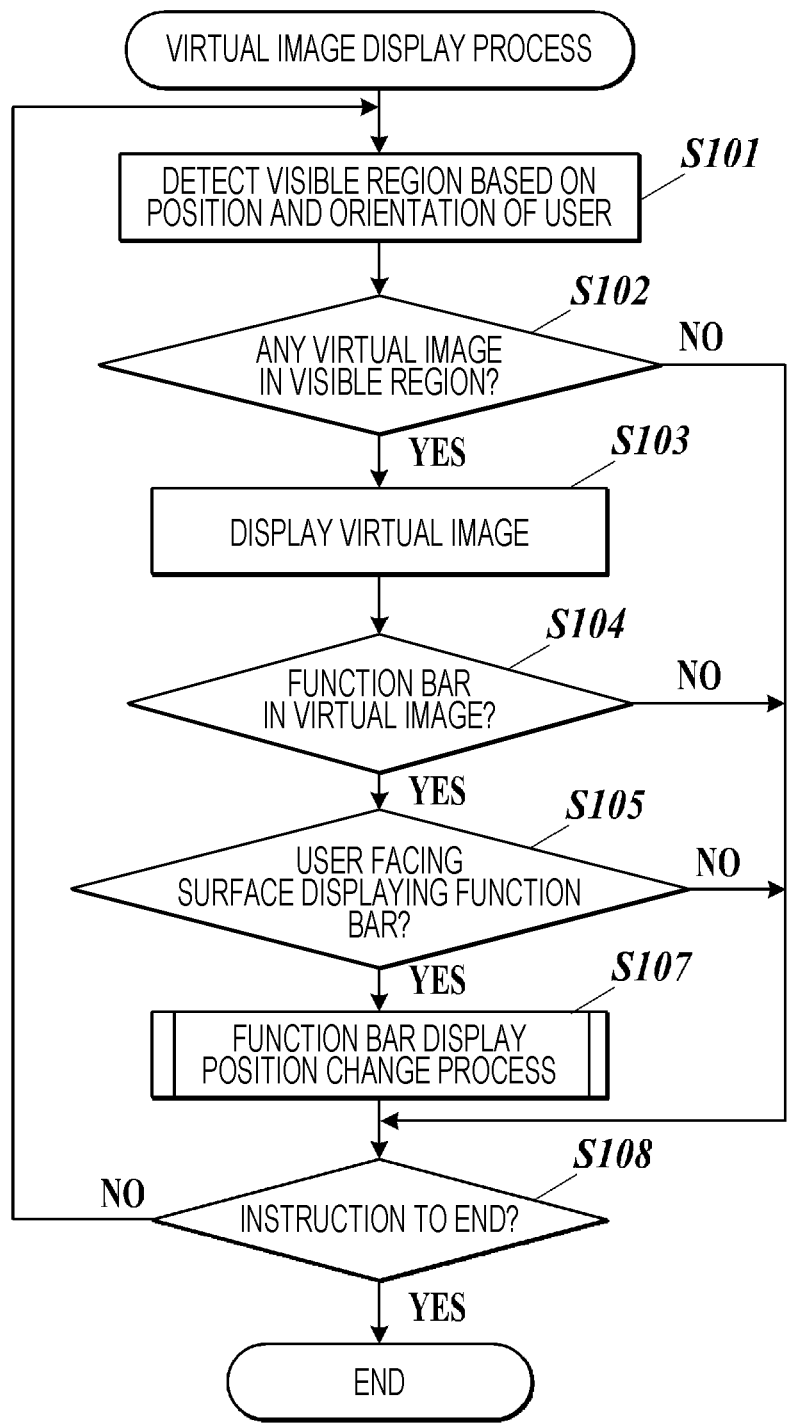
FIG. 25 is a flowchart illustrating a control procedure of a virtual image display process according to a second variation.

FIG. 25 is a flowchart illustrating a control procedure of a virtual image display process according to the second variation.

As illustrated in FIG. 25, the virtual image display process of the second variation is different from the first embodiment and the first variation in that the determination processing equivalent to step S106 of the virtual image display process (see FIG. 6) of the first embodiment and the first variation is not performed. However, the processing of the other steps is common to that of the virtual image display process of the first embodiment and the first variation. Thus, description is omitted.

Figure 26:
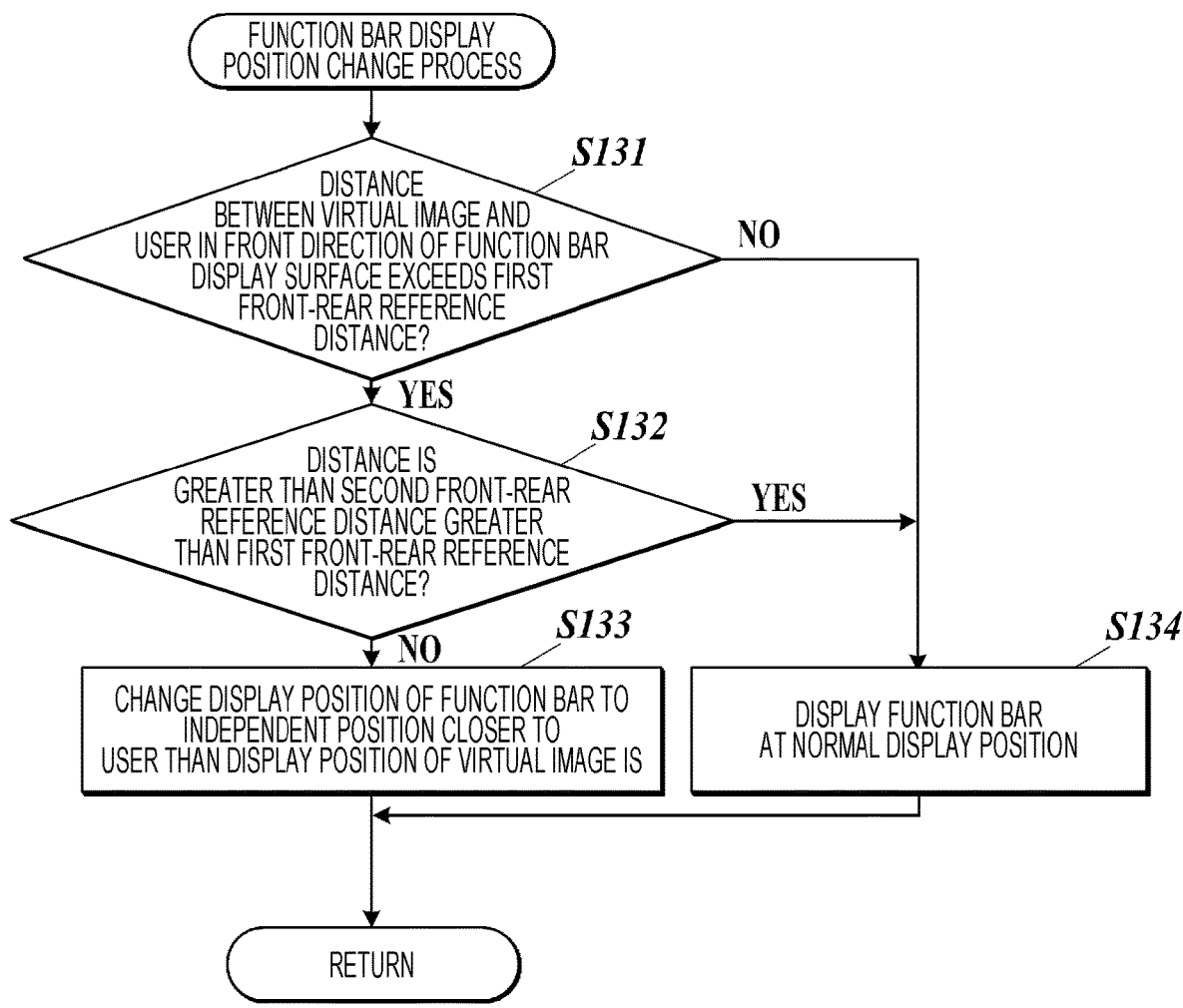
FIG. 26 is a flowchart illustrating the control procedure of the function bar display position change process according to the second variation.

FIG. 26 is a flowchart illustrating a control procedure of a function bar display position change process according to the second variation.

In response to the start of the function bar display position change process illustrated in FIG. 26, the CPU 11 determines whether a distance between the virtual image 30 and the user U in a front direction of the surface displaying the function bar 31 of the virtual image 30 displayed on the display unit 14 exceeds a first front-rear reference distance L11 (step S131).

Figure 27:
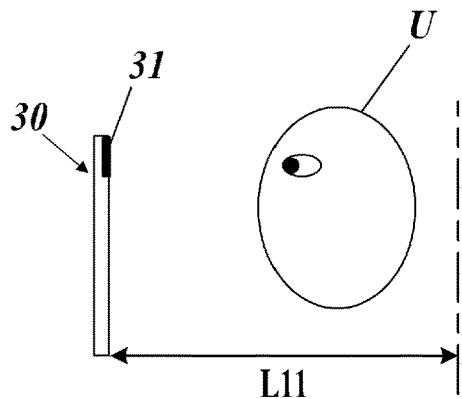
FIG. 27 is a diagram illustrating a state in which a user visually recognizes a virtual image from a position at a first front-rear reference distance or less.

If the CPU 11 determines in step S131 that the distance between the virtual image 30 and the user U does not exceed the first front-rear reference distance L11 (NO in step S131), the CPU 11 displays the function bar 31 at the normal display position as illustrated in FIG. 27 (step S134). The CPU 11 then returns the process to the virtual image display process (see FIG. 25). FIG. 27 is a diagram illustrating a state in which the user U visually recognizes the virtual image 30 from a position at the first front-rear reference distance L11 or less.

If the CPU 11 determines in step S131 that the distance between the virtual image 30 and the user U exceeds the first front-rear reference distance L11 (YES in step S131), the CPU 11 determines whether the distance exceeds a second front-rear reference distance L12 which is longer than the first front-rear reference distance L11 (step S132).

Figure 28:
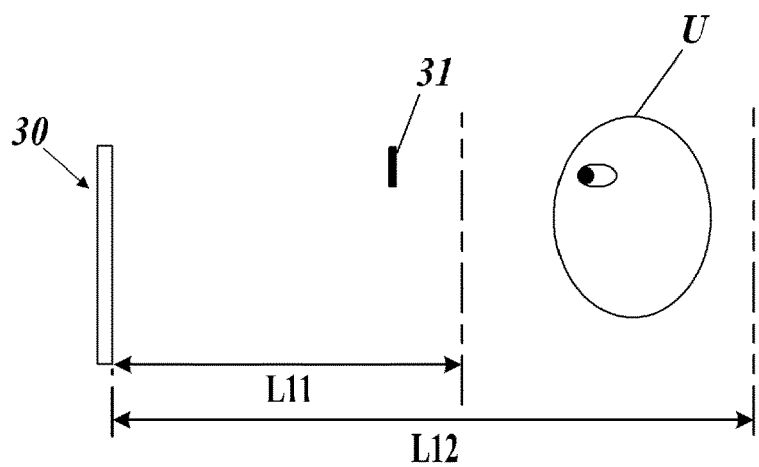
FIG. 28 is a diagram illustrating a state in which the user visually recognizes the virtual image from a position that is beyond the first front-rear reference distance and is at a second front-rear reference distance or less.

If the CPU 11 determines in step S132 that the distance between the virtual image 30 and the user U does not exceed the second front-rear reference distance L12 (NO in step S132), the CPU 11 changes the display position of the function bar 31 to a predetermined independent position closer to the user U than the display position of the virtual image 30 as illustrated in FIG. 28 (step S133). The CPU 11 then returns the process to the virtual image display process (see FIG. 25). FIG. 28 is a diagram illustrating a state in which the user U visually recognizes the virtual image 30 from a position that is beyond the first front-rear reference distance L11 and is at the second front-rear reference distance L12 or less. Note that when the display position of the function bar 31 is changed to the predetermined independent position closer to the user U than the display position of the virtual image 30, the function bar 31 and the virtual image 30 may be displayed in a display style indicating that the function bar 31 and the virtual image 30 have a correspondence (for example, a style in which the function bar 31 and the virtual image 30 have outer frames of the same color or a style in which the function bar 31 and the virtual image 30 are linked by a line).

Figure 29:
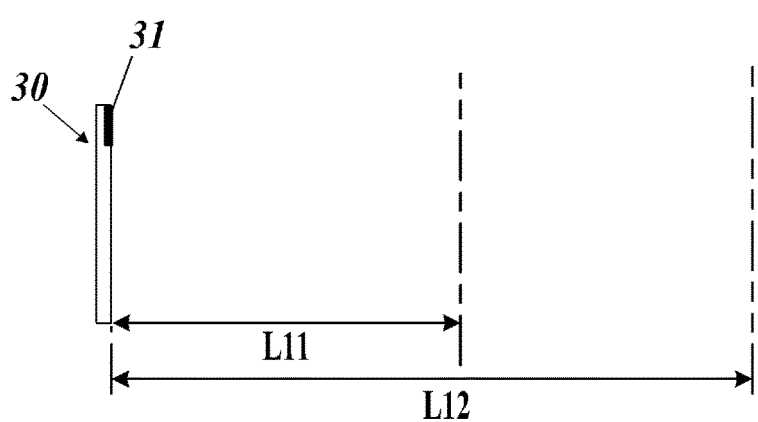
FIG. 29 is a diagram illustrating a state in which the user visually recognizes the virtual image from a position beyond the second front-rear reference distance.
Figure 29:
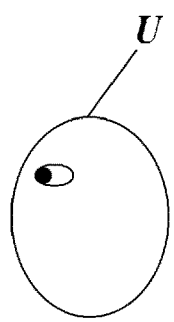

If the CPU 11 determines in step S132 that the distance between the virtual image 30 and the user U exceeds the second front-rear reference distance L12 (YES in step S132), the CPU 11 displays the function bar 31 at the normal display position as illustrated in FIG. 29 (step S134). The CPU 11 then returns the process to the virtual image display process (see FIG. 25). FIG. 29 is a diagram illustrating a state in which the user U visually recognizes the virtual image 30 from a position beyond the second front-rear reference distance L12.

Second Embodiment

A configuration of a display system 1 according to a second embodiment is described. The second embodiment is different from the first embodiment in that an external information processing apparatus 20 performs part of the process performed by the CPU 11 of the wearable terminal apparatus 10 in the first embodiment. Differences from the first embodiment are described below, and description of common points is omitted.

Figure 30:
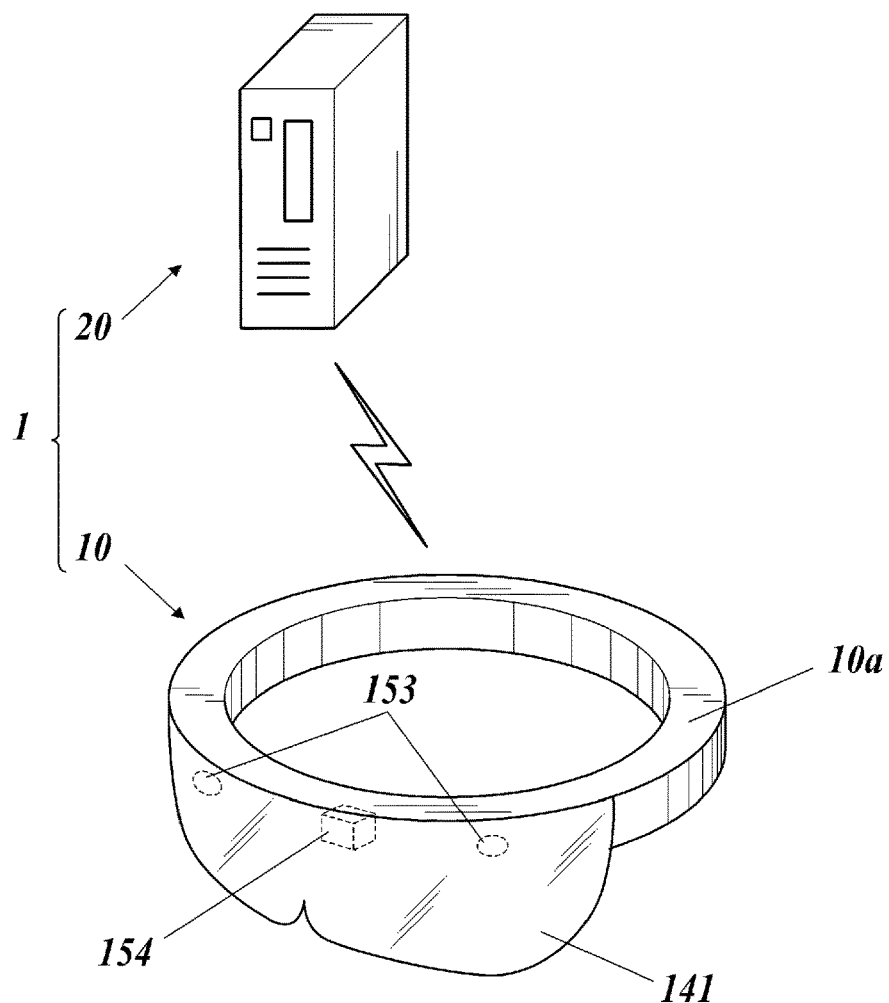
FIG. 30 is a schematic diagram illustrating a configuration of a display system according to a second embodiment.

As illustrated in FIG. 30, the display system 1 includes the wearable terminal apparatus 10 and the information processing apparatus 20 (server) connected to the wearable terminal apparatus 10 by communication. At least part of the communication path between the wearable terminal apparatus 10 and the information processing apparatus 20 may be based on wireless communication. The hardware configuration of the wearable terminal apparatus 10 may be the same as and/or similar to that of the first embodiment, but the processor for performing the same process as the process performed by the information processing apparatus 20 may be omitted.

Figure 31:
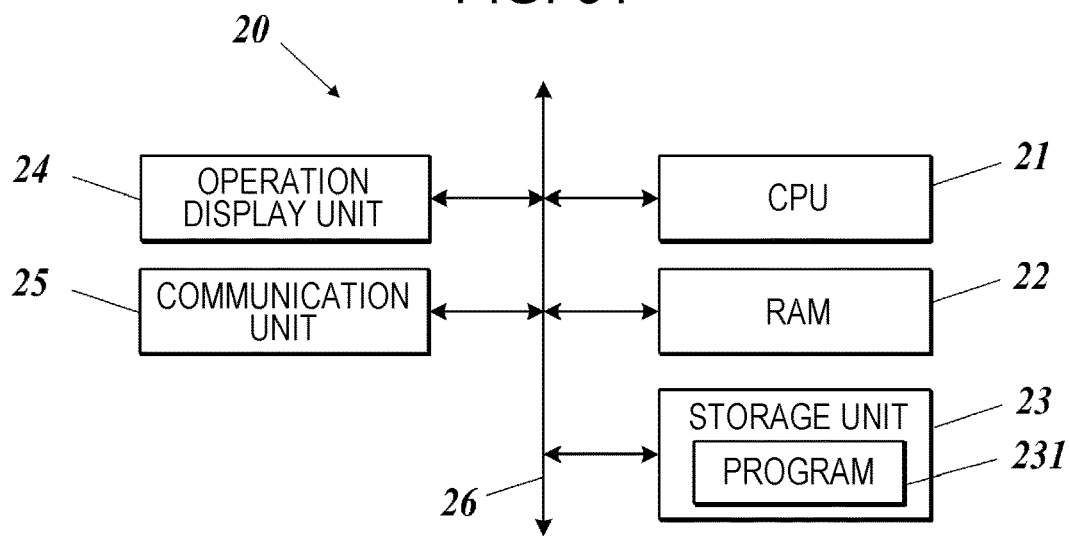
FIG. 31 is a block diagram illustrating a major functional configuration of an information processing apparatus.

As illustrated in FIG. 31, the information processing apparatus 20 includes a CPU 21, a RAM 22, a storage unit 23, an operation display unit 24, and a communication unit 25. These components are connected to one another by a bus 26.

The CPU 21 is a processor that performs various kinds of arithmetic processing and integrally controls operations of the components of the information processing apparatus 20. The CPU 21 reads and executes a program 231 stored in the storage unit 23 to perform various control operations.

The RAM 22 provides a working memory space for the CPU 21 and stores temporary data.

The storage unit 23 is a non-transitory recording medium readable by the CPU 21 which is a computer. The storage unit 23 stores the program 231 to be executed by the CPU 21, various kinds of setting data, and so on. The program 231 is stored in the storage unit 23 in a form of a computer-readable program code. Examples of the storage unit 23 to be used include a nonvolatile storage device such as a solid state drive (SSD) including a flash memory or a hard disk drive (HDD).

The operation display unit 24 includes a display device such as a liquid crystal display and an input device such as a mouse and keyboard. The operation display unit 24 performs various displays such as an operation status and a processing result of the display system 1 on the display device. The operation status of the display system 1 may include an image obtained in real time by the camera 154 of the wearable terminal apparatus 10. The operation display unit 24 converts a user's input operation on the input device into an operation signal and outputs the operation signal to the CPU 21.

The communication unit 25 communicates with the wearable terminal apparatus 10 to transmit and receive data. For example, the communication unit 25 receives data including some or all of the detection results obtained by the sensor unit 15 of the wearable terminal apparatus 10, information related to a user operation (gesture) detected by the wearable terminal apparatus 10, and so on. The communication unit 25 may be capable of communicating with an apparatus other than the wearable terminal apparatus 10.

In the display system 1 thus configured, the CPU 21 of the information processing apparatus 20 performs at least part of the process performed by the CPU 11 of the wearable terminal apparatus 10 in the first embodiment. For example, the CPU 21 may perform three-dimensional mapping of the space 40, based on the detection result obtained by the depth sensor 153. The CPU 21 may detect the visible region 41 of the user in the space 40, based on the detection result obtained by each component of the sensor unit 15. The CPU 21 may generate the virtual image data 132 related to the virtual image 30 in response to an operation of the user of the wearable terminal apparatus 10. The CPU 21 may detect the position and the orientation of the user's hand (and/or finger), based on images obtained by the depth sensor 153 and the camera 154.

The processing result obtained by the CPU 21 is transmitted to the wearable terminal apparatus 10 via the communication unit 25. The CPU 11 of the wearable terminal apparatus 10 operates each component (for example, the display unit 14) of the wearable terminal apparatus 10, based on the received processing result. The CPU 21 may transmit a control signal to the wearable terminal apparatus 10 to control the display on the display unit 14 of the wearable terminal apparatus 10.

In this way, the information processing apparatus 20 performs at least part of the process. This allows the apparatus configuration of the wearable terminal apparatus 10 to be simplified and can reduce the manufacturing cost. The use of the information processing apparatus 20 with higher performance can increase the speed and accuracy of various kinds of processing related to MR. Thus, the accuracy of the 3D mapping of the space 40, the display quality on the display unit 14, and the response speed of the display unit 14 relative to a user operation can be increased.

OTHERS

The embodiments described above are merely an example and may be variously changed.

For example, in each of the embodiments described above, the visor 141 having a light-transmitting property is used to allow the user to visually recognize the real space. However, the configuration is not limited to this. For example, the visor 141 having a light-shielding property may be used to allow the user to visually recognize the image of the space 40 imaged by the camera 154. That is, the CPU 11 may cause the display unit 14 to display the image of the space 40 imaged by the camera 154 and the virtual image 30 superimposed on the image of the space 40. Such a configuration can also implement MR of merging the virtual image 30 with the real space.

The use of an image of the virtual space generated in advance instead of an image of the real space imaged by the camera 154 can implement VR that creates a sensation of being in the virtual space. In this VR, the visible region 41 of the user is identified, and the virtual image 30 whose display position is determined to be inside the visible region 41 in the virtual space are displayed.

The wearable terminal apparatus 10 is not limited to the apparatus having the annular body 10a illustrated in FIG. 1, and may have any structure that has a display unit visually recognizable by the user when the user wears the apparatus. For example, the wearable terminal apparatus 10 may be configured to cover the entire head such as a helmet. The wearable terminal apparatus 10 may have a frame placed on ears such as glasses, and the frame may include various devices built therein.

An example has been described in which a gesture of a user is detected and accepted as an input operation. However, the configuration is not limited to this. For example, the input operation may be accepted using a controller held by the user in hand or worn by the user on the body for use.

In the embodiment above, for example, when a pointer operation mode is set, a setting for not permitting execution of the function bar display position change process (see FIGS. 7, 16, and 26) may be made. The pointer operation mode is an operation mode for the virtual image 30 and is a mode in which an operation on the virtual image 30 is accepted by placing the virtual line 51 displayed in the stretching direction of the user's hand over the virtual image 30.

In the embodiment above, the display position of the function bar 31 included in the virtual image 30 is changed in accordance with the display position of the virtual image 30. However, the configuration is not limited. For example, the user may perform a predetermined gesture, and the display position of the function bar 31 included in the virtual image 30 may be changed in response to the wearable terminal apparatus 10 detecting the gesture.

In the embodiment above, the display position of the function bar 31 included in the virtual image 30 is changed in accordance with the display position of the virtual image 30. However, the target whose display position is changed is not limited to the function bar 31 and may be an image (partial image) of a region in which an object to be operated by the user is displayed. Note that the partial image is preferably an image of a region partitioned from the other region. The partial image is preferably an image of a region near an end portion of the virtual image 30. This partial image includes, as the object, for example, at least one image selected from the group consisting of images of an item, a menu, a function bar, and an icon.

In addition, specific details of the configuration and control described in the embodiments above can be appropriately changed within the scope not departing from the gist of the present disclosure. The configuration and control described in the embodiments above can be combined as appropriate within the scope not departing from the gist of the present disclosure.

INDUSTRIAL APPLICABILITY

The present disclosure can be used for a wearable terminal apparatus, a program, and a display method.

REFERENCE SIGNS 1 display system
10 wearable terminal apparatus
10a body
11 CPU (processor)
12 RAM
13 storage unit
131 program
132 virtual image data
14 display unit
141 visor (display member)
142 laser scanner
15 sensor unit
151 acceleration sensor
152 angular velocity sensor
153 depth sensor
154 camera
155 eye tracker
16 communication unit
17 bus
20 information processing apparatus
21 CPU
22 RAM
23 storage unit
231 program
24 operation display unit
25 communication unit 26 bus
30 virtual image
31 function bar
32 window shape change button
33 close button
40 space
41 visible region
51 virtual line
52 pointer
U user

The invention claimed is:

1. A wearable terminal apparatus to be worn by a user for use, comprising:
a display;
at least one circuitry, wherein
the at least one circuitry is configured to:
cause the display to display a virtual image located in a space; and
change a display position of a partial image when a predetermined condition is satisfied, the partial image being an image of a partial region included in the virtual image; and
a camera configured to image the space, wherein
the at least one circuitry is configured to cause the display to display an image of the space imaged by the camera and the virtual image superimposed on the image of the space.

2. The wearable terminal apparatus according to claim 1, wherein the at least one circuitry is configured to
change the display position of the partial image to an upper position when the virtual image is located below a first above-below reference position in a state in which the user faces a surface of the virtual image displaying the partial image.

3. The wearable terminal apparatus according to claim 2, wherein the at least one circuitry is configured to
change the display position of the partial image in the virtual image when the virtual image is located below the first above-below reference position by a first above-below reference distance or less.

4. The wearable terminal apparatus according to claim 3, wherein the at least one circuitry is configured to
change the display position of the partial image to a position outside the virtual image when the virtual image is located below the first above-below reference position beyond the first above-below reference distance.

5. The wearable terminal apparatus according to claim 1, wherein the at least one circuitry is configured to
change the display position of the partial image to a lower position when the virtual image is located above a second above-below reference position in a state in which the user faces a surface of the virtual image displaying the partial image.

6. The wearable terminal apparatus according to claim 5, wherein the at least one circuitry is configured to
change the display position of the partial image in the virtual image when the virtual image is located above the second above-below reference position by a second above-below reference distance or less.

7. The wearable terminal apparatus according to claim 6, wherein the at least one circuitry is configured to
change the display position of the partial image to a position outside the virtual image when the virtual image is located above the second above-below reference position beyond the second above-below reference distance.

8. The wearable terminal apparatus according to claim 1, wherein the at least one circuitry is configured to
change the display position of the partial image to a rightward position when the virtual image is located on a left side of a first left-right reference position in a state in which the user faces a surface of the virtual image displaying the partial image, and
change the display position of the partial image to a leftward position when the virtual image is located on a right side of a second left-right reference position in the state in which the user faces the surface of the virtual image displaying the partial image.

9. The wearable terminal apparatus according to claim 8, wherein the at least one circuitry is configured to
change the display position of the partial image in the virtual image when the virtual image is located on the left side of the first left-right reference position by a first left-right reference distance or less, and
change the display position of the partial image in the virtual image when the virtual image is located on the right side of the second left-right reference position by a second left-right reference distance or less.

10. The wearable terminal apparatus according to claim 9, wherein the at least one circuitry is configured to
change the display position of the partial image to a position outside the virtual image when the virtual image is located on the left side of the first left-right reference position beyond the first left-right reference distance, and
change the display position of the partial image to a position outside the virtual image when the virtual image is located on the right side of the second left-right reference position beyond the second left-right reference distance.

11. The wearable terminal apparatus according to claim 1, wherein the at least one circuitry is configured to
change the display position of the partial image to an independent position closer to the user than a display position of the virtual image when a distance between the virtual image and the user in a front direction of a surface of the virtual image displaying the partial image exceeds a first front-rear reference distance.

12. The wearable terminal apparatus according to claim 11, wherein the at least one circuitry is configured to
cancel processing of changing the display position of the partial image to the independent position closer to the user than the display position of the virtual image when the distance between the virtual image and the user in the front direction of the surface of the virtual image displaying the partial image exceeds a second front-rear reference distance that is longer than the first front-rear reference distance.

13. The wearable terminal apparatus according to claim 11, wherein the at least one circuitry is configured to
display the partial image and the virtual image in a display style indicating that the partial image and the virtual image have a correspondence when the display position of the partial image is changed to the independent position closer to the user than the display position of the virtual image.

14. The wearable terminal apparatus according to claim 1, wherein the at least one circuitry is configured to:
permit changing of the display position of the partial image when the virtual image is displayed at a position at a predetermined change permitted distance or less from the user; and not permit changing of the display position of the partial image when the virtual image is displayed at a position beyond the predetermined change permitted distance from the user.

15. The wearable terminal apparatus according to claim 1, wherein the at least one circuitry is configured to:
  permit changing of the display position of the partial image when the user is located at a position where the user is able to virtually touch the virtual image, and
  not permit changing of the display position of the partial image when the user is not located at a position where the user is able to virtually touch the virtual image.

16. The wearable terminal apparatus according to claim 1, wherein
  a pointer operation mode for accepting a pointer operation is provided as an operation mode for the virtual image, the pointer operation being an operation to be performed on the virtual image by placing a virtual line displayed in a stretching direction of a hand of the user over the virtual image, and
  the at least one circuitry is configured to
  not permit changing of the display position of the partial image when the pointer operation mode is set.

17. The wearable terminal apparatus according to claim 2, further comprising:
  a sensor configured to acquire position information of the wearable terminal apparatus, and
  the at least one circuitry is configured to
  determine a display position of the virtual image, based on the position information acquired by the sensor.

18. The wearable terminal apparatus according to claim 17, further comprising:
  line-of-sight detection means configured to detect a line of sight of the user, and
  the at least one circuitry is configured to
  determine the display position of the virtual image, based on the line of sight detected by line-of-sight detection means.

19. The wearable terminal apparatus according to claim 1, wherein the partial image is an image of a region in which an object to be subjected to a user operation is displayed.

20. The wearable terminal apparatus according to claim 19, wherein the partial image includes, as the object, at least one image selected from the group consisting of images of an item, a menu, a function bar, and an icon.

21. The wearable terminal apparatus according to claim 1, wherein the partial image is an image of a region partitioned from an other region.

22. The wearable terminal apparatus according to claim 1, wherein the partial image is an image of a region near an end portion of the virtual image.

23. A non-transitory computer-readable storage medium storing a program for causing a computer provided in a wearable terminal apparatus to perform a process, the wearable terminal apparatus being an apparatus to be worn by a user for use, the process comprising:
  causing a display to display a virtual image located in a space;
  changing a display position of a partial image when a predetermined condition is satisfied, the partial image being an image of a partial region included in the virtual image; and
  causing the display to display an image of the space imaged by a camera and the virtual image superimposed on the image of the space.

24. A display method for a wearable terminal apparatus to be worn by a user for use, comprising:
  causing a display to display a virtual image located in a space;
  changing a display position of a partial image when a predetermined condition is satisfied, the partial image being an image of a partial region included in the virtual image; and
  causing the display to display an image of the space imaged by a camera and the virtual image superimposed on the image of the space.

* * * * *